(12) United States Patent
Wang

(10) Patent No.: US 12,500,989 B2
(45) Date of Patent: Dec. 16, 2025

(54) VIRTUAL GROUP IMAGE

(71) Applicant: TENCENT TECHNOLOGY (SHENZHEN) COMPANY LIMITED, Guangdong (CN)

(72) Inventor: Qianyi Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/661,440

(22) Filed: May 10, 2024

(65) Prior Publication Data

US 2024/0297952 A1 Sep. 5, 2024

Related U.S. Application Data

(63) Continuation of application No. 17/716,997, filed on Apr. 8, 2022, now Pat. No. 12,022,224, which is a
(Continued)

(30) Foreign Application Priority Data

Mar. 13, 2020 (CN) .......................... 202010175237.9

(51) Int. Cl.
*H04N 5/262* (2006.01)
*H04L 65/1089* (2022.01)
(Continued)

(52) U.S. Cl.
CPC ....... *H04N 5/2621* (2013.01); *H04L 65/1089* (2013.01); *H04N 7/152* (2013.01);
(Continued)

(58) Field of Classification Search
CPC ...... H04N 5/2621; H04N 7/152; H04N 7/157; H04N 23/632; H04N 23/80; H04N 23/62;
(Continued)

(56) References Cited

U.S. PATENT DOCUMENTS

| 2009/0147141 | A1 | 6/2009 | Lee et al. |
| 2009/0257730 | A1 | 10/2009 | Chen et al. |

(Continued)

FOREIGN PATENT DOCUMENTS

| CN | 101431613 A | 5/2009 |
| CN | 101562682 A | 10/2009 |

(Continued)

OTHER PUBLICATIONS

Chinese Office Action for 202010175237.9, issued Jan. 28, 2023, 10 pages.
(Continued)

*Primary Examiner* — Shahbaz Nazrul
(74) *Attorney, Agent, or Firm* — ArentFox Schiff LLP

(57) ABSTRACT

An image shooting method is provided. In the method, a virtual room page of a virtual room is displayed. The virtual room page includes a shooting control element and an image region. The image region is configured to display a preview image that is generated based on user images of at least two users in the virtual room. Image capturing of the preview image is performed when the shooting control element is selected. A captured image that is generated based on the preview image is output.

14 Claims, 11 Drawing Sheets

Related U.S. Application Data continuation of application No. PCT/CN2020/125887, filed on Nov. 2, 2020.

(51) Int. Cl.
  *H04N 7/15* (2006.01)
  *H04N 23/63* (2023.01)
  *H04N 23/80* (2023.01)
  *H04N 23/951* (2023.01)

(52) U.S. Cl.
  CPC ............ *H04N 7/157* (2013.01); *H04N 23/632* (2023.01); *H04N 23/80* (2023.01); *H04N 23/951* (2023.01)

(58) Field of Classification Search
  CPC .............. H04N 23/631; H04N 23/951; H04L 65/1089; G06F 3/04842; G06F 3/04847; G06F 3/0488; G06F 21/606; G06F 3/0482; G06F 3/0481; G06T 11/60
  See application file for complete search history.

(56) References Cited

U.S. PATENT DOCUMENTS

| | | | |
|---|---|---|---|
| 2014/0181704 | A1 | 6/2014 | Madonna et al. |
| 2015/0009359 | A1 | 1/2015 | Zaheer et al. |
| 2015/0334142 | A1* | 11/2015 | Gottlieb ........... H04N 21/47205 715/753 |
| 2018/0095635 | A1 | 4/2018 | Valdivia et al. |
| 2018/0095636 | A1* | 4/2018 | Valdivia .................. G06F 3/011 |
| 2019/0362312 | A1 | 11/2019 | Platt et al. |
| 2020/0177645 | A1 | 6/2020 | Yoshida |
| 2021/0227151 | A1* | 7/2021 | Song .................... H04N 23/951 |

FOREIGN PATENT DOCUMENTS

| | | | |
|---|---|---|---|
| CN | 102158681 | A | 8/2011 |
| CN | 102821253 | A | 12/2012 |
| CN | 105471704 | A | 4/2016 |
| CN | 105608715 | A | 5/2016 |
| CN | 106067960 | A | 11/2016 |
| CN | 106254951 | A | 12/2016 |
| CN | 107666567 | A | 2/2018 |
| CN | 108718383 | A | 10/2018 |
| CN | 109040643 | A | 12/2018 |
| CN | 109309866 | A | 2/2019 |
| CN | 109391792 | A | 2/2019 |
| CN | 111371993 | A | 7/2020 |
| JP | 3001513 | U | 8/1994 |
| JP | 2005-303360 | A | 10/2005 |
| WO | 2013/163904 | A1 | 11/2013 |

OTHER PUBLICATIONS

International Search Report and Written Opinion for PCT/CN2020/125887, issued Jan. 27, 2021, 13 pages, English translation included.

Supplementary European Search Report for 20924850.9, issued Nov. 4, 2022, 10 pages.

* cited by examiner

VIRTUAL GROUP IMAGE

RELATED APPLICATIONS

This application is a continuation of U.S. application Ser. No. 17/716,997, "IMAGE CAPTURING METHOD AND APPARATUS, COMPUTER DEVICE, AND STORAGE MEDIUM" filed on Apr. 8, 2022, which is a continuation of International Application No. PCT/CN2020/125887, entitled "IMAGE CAPTURING METHOD AND APPARATUS, AND COMPUTER DEVICE AND STORAGE MEDIUM" and filed on Nov. 2, 2020, which claims priority to Chinese Patent Application No. 202010175237.9, entitled "IMAGE CAPTURING METHOD AND APPARATUS, COMPUTER DEVICE, AND STORAGE MEDIUM" filed on Mar. 13, 2020. The entire disclosures of the prior applications are hereby incorporated by reference in their entirety.

FIELD OF THE TECHNOLOGY

This application relates to the field of Internet technologies, including image capturing.

BACKGROUND OF THE DISCLOSURE

In daily life, image capturing by using an electronic device that may have an image shooting function, such as a mobile phone or a camera, is a common operation. The shooting function can be used to capture any content. For example, shooting may be performed by using the electronic device for several objects that are aggregated together (e.g., the electronic device can shoot or capture a scene with several objects or cluster(s) of objects).

SUMMARY

According to various embodiments provided in this disclosure, an image capturing method and apparatus, a computer device, and a non-transitory computer-readable storage medium are provided.

An embodiment of this disclosure provides an image capturing method. In the method, a virtual room page of a virtual room is displayed. The virtual room page includes a shooting control element and an image region. The image region is configured to display a preview image that is generated based on user images of at least two users in the virtual room. Image capturing of the preview image is performed when the shooting control element is selected. A captured image that is generated based on the preview image is output.

An embodiment of this disclosure provides an apparatus including processing circuitry. The processing circuitry is configured to display a virtual room page of a virtual room. The virtual room page includes a shooting control element and an image region. The image region is configured to display a preview image that is generated based on user images of at least two users in the virtual room. The processing circuitry is configured to perform image capturing of the preview image when the shooting control element is selected. Further, the processing circuitry is configured to output a captured image that is generated based on the preview image.

An embodiment of this disclosure further provides a computer device, including a memory, one or more processors, and computer-readable instructions that are stored in the memory and that capable of running on the one or more processors, the one or more processors implementing the image capturing method.

An embodiment of this disclosure further provides a non-transitory computer-readable storage medium storing instructions which when executed by one or more processors cause the one or more processors to perform the image capturing method.

Details of one or more embodiments of this disclosure are provided in the accompanying drawings and descriptions below.

BRIEF DESCRIPTION OF THE DRAWINGS

To describe the technical solutions in the embodiments of this disclosure, the following briefly describes the accompanying drawings. The accompanying drawings in the following description show merely some embodiments of this disclosure.

DESCRIPTION OF EMBODIMENTS

Figure 1:
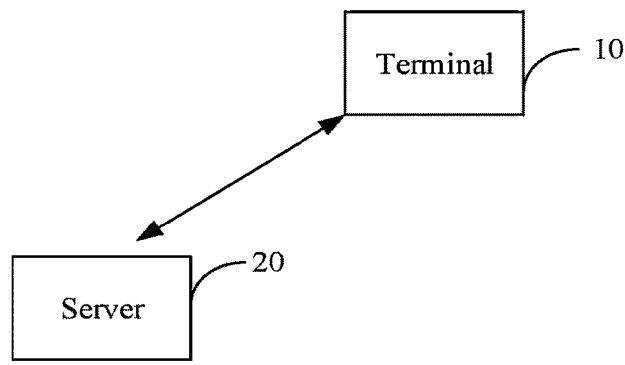
FIG. 1 is an exemplary schematic scenario diagram of an image capturing method according to an embodiment of this disclosure.

The following describes technical solutions in embodiments of this disclosure with reference to the accompanying drawings. The described embodiments are some of the embodiments of this disclosure rather than all of the embodiments. Other embodiments are within the scope of this disclosure.

Artificial Intelligence (AI), for example, is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology of computer science, which attempts to understand the essence of intelligence and produce a new type of intelligent machine that can react in a similar way to human intelligence. AI is to study design principles and implementation methods of various intelligent machines, so that the machines have the functions of perception, reasoning, and decision-making.

Computer vision (CV), for example, is a science that studies how to enable a machine to "see", and to be specific, to implement machine vision such as recognition, tracking, measurement, and the like for a target by using a camera and a computer in replacement of human eyes, and further perform graphic processing, so that the computer processes the target into an image more suitable for human eyes to observe, or more suitable to be transmitted to an instrument for detection. As a scientific subject, CV studies related theories and technologies, and attempts to establish an AI system that can obtain information from images or multi-dimensional data. The CV technologies include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

With the research and progress of the AI technology, the AI technology is studied and applied to a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied in more fields, and play an increasingly important role.

Solutions provided in embodiments of this disclosure relate to technologies such as CV of AI, and are used as example to describe the following embodiments.

Embodiments of this disclosure include an image capturing, or image shooting. The embodiments of this disclosure may be integrated into a first image capturing apparatus and a second image capturing apparatus. The first image capturing apparatus may be integrated into a first computer device. The first computer device may include an electronic device such as a terminal or a server. The terminal may include an electronic device that can perform image capturing, such as a camera, a video camera, a smartphone, a tablet computer, a notebook computer, or a personal computer. The terminal may be a single terminal, or may be a terminal set including several terminals. The server may be a single server, or may be a server cluster.

The second image capturing apparatus may be integrated into a second computer device. The second computer device may include an electronic device such as a terminal or a server. The terminal may include an electronic device that can perform image capturing, such as a camera, a video camera, a smartphone, a tablet computer, a notebook computer, or a personal computer. The terminal may be a single terminal, or may be a terminal set including several terminals. The server may be a single server, or may be a server cluster. The server may include a web server, an application server, a data server, and the like.

The following describes an image capturing method by using an example in which the first computer device is a terminal and the second computer device is a server in this embodiment of this disclosure.

As shown in FIG. 1, in an embodiment of this disclosure, interaction is performed between the terminal and the server. This embodiment describes an image capturing system, which may be expanded by using an example in which a first image capturing apparatus integrated on a terminal 10 and a second image capturing apparatus integrated on a server 20.

The terminal 10 may display a user operation page of an information exchange virtual room of a client, the user operation page including a shooting control and an image region, the image region including a preview image, and the preview image including member images of at least two room members. The terminal 10 may perform image capturing on the preview image when a trigger operation for the shooting control is detected, and then the terminal 10 may output a captured, or shot, image.

Before displaying the user operation page of the information exchange virtual room of the client, the terminal 10 may acquire an image collected in real time by a local terminal, extract a local member image in the real-time collected image and location information of the local member image in the real-time collected image, transmit the local member image and the location information of the local member image to the server 20, and finally receive a preview image returned by the server 20 based on the local member image and the location information of the local member image, where the preview image includes member images of at least two room members.

For example, an information exchange virtual room includes two room members: a member 1 and a member 2. The terminal 10 may include a terminal A and a terminal B. On the terminal A, an application may transmit, to the server 20 by using the member 1 of the information exchange virtual room, a member image 1 and location information of the member image 1 that are extracted from an image collected in real time by a local terminal. On the terminal B, the application may transmit, to the server 20 by using the member 2 of the information exchange virtual room, a member image 2 and location information of the member image 2 that are extracted from an image collected in real time by a local terminal, and then the terminals A and B may receive a preview image returned by the server 20, where the preview image includes the member image 1 of the member 1 and the member image 2 of the member 2.

The server 20 may receive member images of at least two room members. The member image carries location information. Then, based on a quantity of member images and a preset display mode, the server 20 may determine an image sub-region of each member image in the preview image, and separately render, according to the location information carried in the member image, each member image to an image sub-region corresponding to the member image, to obtain the preview image. The server 20 may further implement an image effect based on presetting an image effect as the preview image, and transmit the preview image to the terminal 10 after the image effect is implemented.

For example, the server 20 may receive the member image 1, the location information of the member image 1, the member image 2, and the location information of the member image 2, and then determine, according to the quantity of member images (e.g., the quantity of member images is 2) and the preset display mode (e.g., a same-screen mode), that an image sub-region of the member image 1 is the left ⅔ region of the preview image, and an image sub-region of the member image 2 is the right ⅔ region of the preview image; and renders the member image 1 in the left ⅓ region of the preview image according to the location information corresponding to the member image 1 (the left ½), and renders the member image 2 in the middle ⅓ region of the preview image according to a relative location corresponding to the member image 2, to obtain a preview image and implement an image effect (render a background of the preview image to yellow) for the preview image according to a preset image effect (e.g., the background is yellow), and transmits a preview image obtained after the image effect is implemented (a preview image whose background is yellow) to the terminal 10. The terminal 10 may include the terminal A and the terminal B.

Detailed descriptions are separately provided below. The description sequence of the following embodiments is not intended to limit orders of the embodiments.

An embodiment of this disclosure is described from a perspective of a first image capturing apparatus. The first image capturing apparatus may be specifically integrated into a terminal that can perform image capturing.

Figure 2:
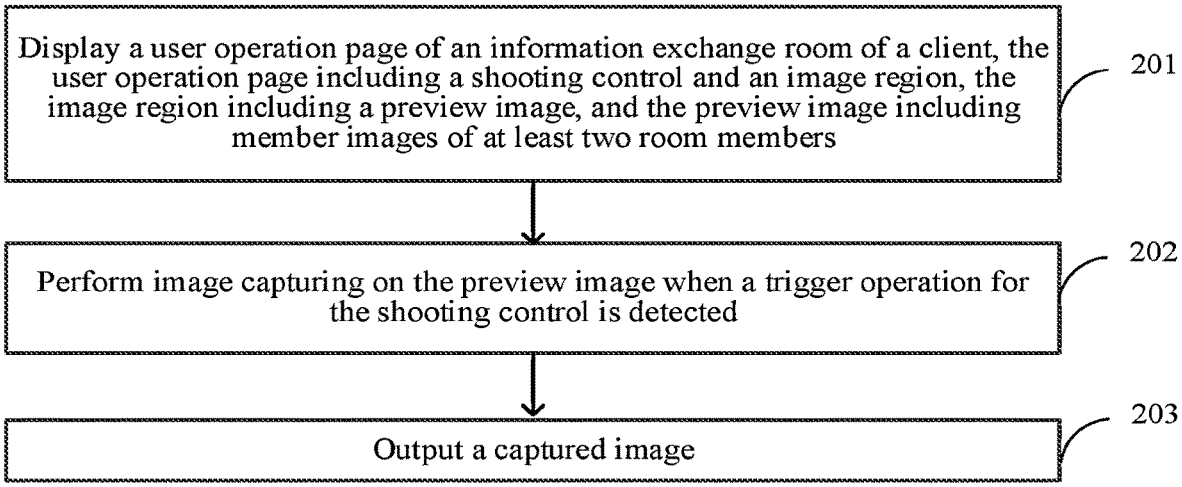
FIG. 2 is an exemplary schematic flowchart of an image capturing method according to an embodiment of this disclosure.

An embodiment of this disclosure provides an image capturing method. The method may be performed by one or more processors of a terminal. As shown in FIG. 2, a procedure of the image capturing method may be as follows:

In step 201, a user operation page of an information exchange virtual room is displayed. The user operation page can include a shooting control and an image region, the image region including a preview image, and the preview image including member images of at least two room members. In an example, a virtual room page of a virtual room is displayed. The virtual room page includes a shooting control element and an image region. The image region is configured to display a preview image that is generated based on user images of at least two users in the virtual room.

The information exchange virtual room can be a virtual room used for exchanging information. It may be understood that the information exchange virtual room is a virtual room created online, and may be used for information exchange and virtual article exchange.

The image in this embodiment of this disclosure may include an original image collected by an image capturing apparatus on the terminal, for example, an image collected by a camera mounted on the terminal may be used as an original image when an image processing control is not enabled. Compared with a processed image, the original image may display content and details of a real scene more accurately.

The image in this embodiment of this disclosure may alternatively include a processed image obtained after an original image is processed in a certain manner. A processing process herein may be performed by the terminal, or may be performed by the terminal by transmitting the original image to another computer device (such as a server) that can perform image processing. Then, the another computer device returns the processed image to the terminal, and the terminal displays the processed image on a page. In this manner, the original image can be flexibly adjusted according to an actual requirement of a user (such as beautifying the image or magnifying the image locally), thereby better meeting a personalized requirement of the user and obtaining a more accurately processed image.

The image may include a single image, or may include a video image formed by several frames of images. Image content may include any content that can be collected by the image capturing apparatus of the terminal. According to different performance of the image capturing apparatus, collected image content may change over time. Understanding of the image content is not to be limited to a specific content collection capability of the image capturing apparatus, but it is to be considered that the content is image content in this embodiment provided that there is a shooting apparatus that can collect the content. The image content may include an object, such as a human, an animal, an article, or a plant, or may include a natural phenomenon, such as rain, fog, or sunset.

The image capturing apparatus may be a camera included in the terminal, such as a smartphone. In this manner, an existing resource is used, and image capturing may be more convenient and fast. Alternatively, the terminal may be connected to an external image capturing apparatus in a wired or wireless manner, for example, a drone (e.g., an external shooting apparatus) connected to the terminal in a wireless manner.

A room member is an entity of transmitting and receiving information in an information exchange virtual room. The information exchange virtual room includes a process in which only a room member can perform information exchange. The room member is a virtual object, and the room member may be controlled by one or more control objects to act. The control object herein may be a real user, or may be another type of virtual object in a special scenario (e.g., a test or an experiment scenario). In this embodiment of this disclosure, the image region of the user operation page displays a member image of a room member, and content of a member image displayed by a room member is not limited. For example, if the member image is a human image, a quantity of human images in any member image is not limited. In an application scenario, content of a member image may be flexibly adjusted, according to an actual requirement, by a control object controlling a room member, and is not described herein.

The information exchange virtual room may include several room members, so that information exchange such as video, voice, or text may be performed between the room members. The information exchange virtual room is relatively closed, and content data of information exchange in the room is not directly disclosed to all users. To view the content of the information exchange virtual room, the information exchange virtual room needs to be joined first. Specifically, a manner of joining the information exchange virtual room is related to a closure degree, such as privacy degree, of the information exchange virtual room. The closure degree of the information exchange virtual room depends on a scenario applicable to the information exchange virtual room. For example, if an information exchange virtual room disclosed on the Internet is to be joined, such as a live game room (or a live game playback room) or a live shopping room (or a live shopping playback room), the information exchange virtual room may be directly joined by using a public join channel of the information exchange virtual room, and the more aggregated members of this information exchange virtual room, the better. Therefore, the closure degree is relatively low.

To join a locally closed information exchange virtual room, for example, an audio and video conversation room, a live broadcast room, and a conference room that are open only to some users, the information exchange virtual room is set and opened for some members, and has a relatively high closure degree. Specifically, when the information exchange virtual room is created, a creator may preselect a member that can join the room, or a member in the information exchange virtual room may select a member that can join the room. In this case, when it is determined whether a member requesting to join the room is a member that can join the room, the information exchange virtual room may directly identify a member identifier of the member requesting to join the room, or may identify a member identifier and verification information corresponding to the member identifier (e.g., a password, a fingerprint, or a face of an account corresponding to the member).

In addition, verification information may also be set for the information exchange virtual room. The verification information may include a room identifier (such as a room number, a room two-dimensional code, or a room name), and a room password (such as a set character password or picture password). Verification may be performed by using one type of verification information or a combination of multiple types of verification information. When a member wants to join the information exchange virtual room, verification information may be outputted on a join page. When verification succeeds, the user can join the room.

Based on an application scenario of the information exchange virtual room, a manner of joining the room may be flexibly set in an actual operation. Generally, a higher closure degree of the information exchange virtual room requires more verification information when joining the information exchange virtual room. In addition, based on an objective condition of the application scenario or a requirement for the closure degree of the information exchange virtual room, the information exchange virtual room may be operated based on the Internet, or may be operated based on a local region network or a wide region network. This is specifically limited by settings in actual use, and not limited herein.

The user operation page may be a main page in the information exchange virtual room. The user operation page may include an image region and a function region. The image region may include a preview image in the information exchange virtual room before shooting is performed. The preview image may enable a member to view an image effect, and adjust (e.g., adjust a shooting angle, adjust a function control, or adjust a shooting object) in a timely manner, so as to shoot an image that better meets the member's expectation.

The preview image may include a preview picture of a to-be-shot image, and the preview image includes at least two member images. The member image may be obtained based on an image collected by an image capturing apparatus on a terminal of a room member, the member image may include some or all image information of the collected image, and a quantity of image information included in the member image may be set according to an actual requirement. For example, if a member image in the preview image is used as a background of the preview image, the member image may store all image information of the collected image. For another example, if two member images in the preview image are used as subjects of the preview image, the collected image may be processed according to a rule (the rule may be preset, or may be selected by a member of the room itself), some image information of the collected image is retained after the image is processed, to obtain a member image, and the member image is displayed on the preview picture; and the collected image is converted to obtain a member image, which may depend on an operation of a room member corresponding to the member image.

Display of the member image on the preview picture may be determined according to a member image display policy, and preview images obtained according to different member image display policies are also different. Specifically, the member image display policy may be preset, or may be set by a room member in the information exchange virtual room. For example, the member image display policy may be preset (e.g., the preset member image display policy is shooting a group photo) by an application to which the information exchange virtual room belongs, and each member image includes a human image, and the preview image obtained according to this may include a preview image of a human image of each member image.

The function region may include several function controls. The function control may include an effect control for adjusting and optimizing a preview image, for example, a control for adjusting resolution, aperture, or ISO, or a control for adjusting a shooting mode such as a portrait mode, a landscape mode, or a night mode. For example, when a shooting object of a member is a person, the portrait mode may be enabled to achieve a better shooting effect.

The function region may also include a shooting control for setting a shooting operation. The shooting control may be a button, a text box, or the like, and triggering of the button may include tapping (such as long press or double tap), or sliding. The shooting control may have multiple types, and may include a common trigger shooting control, which may be a trigger shooting control on a manually triggered page; or may be a touching shooting control, which may be an image region on a manually triggered page, that is, a trigger image capturing, and the like.

Some intelligent shooting controls, such as a voice shooting control or a smile shooting control may be further included. Voice shooting may be based on a set voice, and the set voice may include a specific voice (such as "shooting" in Mandarin) or shooting performed based on an unspecific voice (such as any sound that can be received by the terminal and that is greater than a specific decibel). Specifically, after a member triggers the voice shooting control, the terminal automatically triggers the image capturing after receiving the voice that meets the preset voice.

For the smile shooting control, smile shooting may automatically trigger shooting when it is detected that a set quantity and a smile expression are met in a preview picture. In addition, the set quantity may be flexibly set. In addition to the smile expression, actions such as eye-opening shooting and heart-sign shooting may be set according to an actual application requirement, or shooting that needs to meet two or more actions (such as satisfying a smile and a heart sign) may be performed.

Some shooting manner setting controls may be further included, such as a shortcut shooting setting control, a continuous shooting setting control, or a countdown shooting setting control.

The client may be an application client on the terminal. The application may include an information exchange virtual room, and each room member of an information exchange virtual room may display a user operation page of the information exchange virtual room on a client of a terminal of the room member. A preview image displayed on the user operation page of each room is the same. The preview image includes a member image of each room member. Before the preview image displays the member image, it may be determined, according to a member image display policy, how to display each member image, where a quantity of room members is at least two.

A preview image is displayed in an image region of a user operation page, and the preview image includes at least two member images. In this case, the preview image may display image content that is actually not in the same real space together, and different preview images may be presented based on different member image display policies. For example, a group photo of three family members in different real spaces may be shot. In this embodiment, a space distance is overcome according to an actual requirement, and different member images are placed in the same preview image by using a technology, thereby significantly improving interestingness of image capturing.

Figure 3:
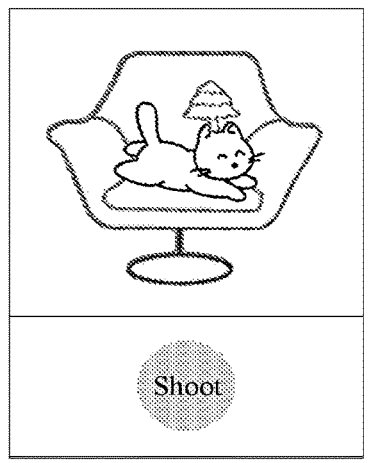
FIG. 3 is an exemplary schematic diagram of a partial page operation of an image capturing method according to an embodiment of this disclosure.

For example, an information exchange virtual room in an image capturing, or shooting, application includes three room members: Xiao A, Xiao B, and Xiao C. A member image obtained by using a shooting application client of Xiao A is a chair, a member image obtained by using a shooting application client of Xiao B is a pine tree, and a member image obtained by using a shooting application client of Xiao C is a cat. A preview image is displayed on a user operation page of each of Xiao A, Xiao B, and Xiao C, and the preview image includes the foregoing three member images. A member image display policy is determined according to Xiao A, Xiao B, and Xiao C. As shown in FIG. 3, the figure is a user operation page of Xiao A, the user operation page includes an image region and a function region, display content of a preview image included in the image region is a cat sitting on a chair and having a pine tree above, and the function region includes a shooting control.

In an embodiment, the step of "displaying a user operation page of an information exchange virtual room of a client" may include:

displaying a room setting page of a client, the room setting page including a room creation control; and displaying a user operation page of a created information exchange virtual room based on a trigger operation for the room creation control.

The room setting page may include a control for setting related information of the information exchange virtual room.

For example, the room setting page may include a room creation control used for creating an information exchange virtual room. The room creation control may be a button, an input box, or the like. A room member who wants to create an information exchange virtual room may create an information exchange virtual room by triggering the room creation control. After creation, a user operation page of the information exchange virtual room may display a room setting control, and a room setting page may be displayed by triggering the room setting control. The room setting page may include related information (such as a room identifier) of the created information exchange virtual room, and may further include several function controls for setting the created information exchange virtual room, such as a name input control for setting a name of the information exchange virtual room, a control for adjusting a user operation page of the information exchange virtual room, an operation page adjustment control for a display proportion and a quantity of regions, and a style control for changing a display style of the information exchange virtual room.

In addition, some function controls in the room setting page may be automatically set by the client or manually set by a room member in the information exchange virtual room according to actual use frequency or the like, and some function controls that have high use frequency or are important to a room Xiao Are placed on the user operation page.

The room setting page may be displayed on the client of the terminal of the room member. The room setting page may include a room creation control. After the room member triggers an operation on the room creation control, the terminal receives the trigger operation, creates an information exchange virtual room according to the trigger operation, and displays a user operation page of the information exchange virtual room on the client. In this case, the user operation page displays a member image that includes the room member who creates the room.

The client includes a room creation control for creating an information exchange virtual room. Any room member of an application to which the client belongs may create an information exchange virtual room according to a requirement, and perform a related operation in the information exchange virtual room.

Figure 4:
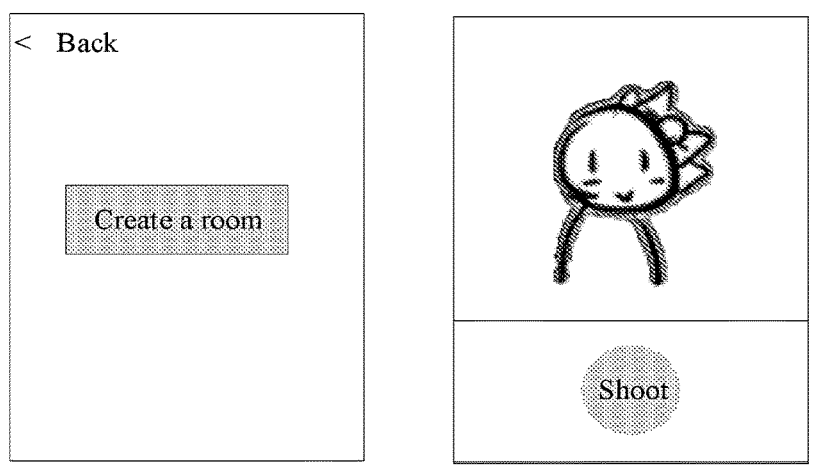
FIG. 4 is an exemplary schematic diagram of another partial page operation of an image capturing method according to an embodiment of this disclosure.

For example, referring to FIG. 4, FIG. 4 is a schematic diagram of a page operation of creating an information exchange virtual room. Xiao A wants to create an information exchange virtual room. On a room setting page of a shooting application client, Xiao A taps a room creation control in a button form (a room creation button in the figure), and the shooting application creates an information exchange virtual room for Xiao A and displays a user operation page of the created information exchange virtual room on the client of the shooting application. The user operation page includes a member image (a girl) of Xiao A.

In an embodiment, the step of "displaying a user operation page of a created information exchange virtual room based on a trigger operation for the room creation control" may include displaying an authentication control based on the trigger operation for the room creation control; and setting authentication information of the created information exchange virtual room when detecting that a setting operation for the authentication control is completed, and displaying the user operation page of the created information exchange virtual room.

The authentication control may be in a display form such as a button or an input box, and the authentication control may be displayed in multiple forms and encrypted in multiple forms. For example, the authentication control may be a password setting control, and the password setting control may be in a form of an input box. A user who is to create an information exchange virtual room may input a character password (e.g., a character password in a form of a number, a symbol, a character, or a letter) in the password setting control. After receiving the character password inputted by the user, the client sets the character password as a password of the information exchange virtual room.

For another example, the authentication control may be a password selection control. To quickly set a password for the information exchange virtual room, the application may preset several preset passwords. The password selection control may be a button that includes several password setting options. When the user performs encryption setting, only a target preset password needs to be selected from the several preset passwords displayed in the password selection control, so as to complete an encryption setting operation. The application automatically sets the target preset password selected by the user as the password of the information exchange virtual room.

In addition, the authentication control may further be in a button form, such as an encryption button. After the user triggers the encryption button, the client may set a verification condition for the information exchange virtual room, and the verification condition may include multiple forms, for example, question verification and limited verification. Question verification may include a question that another user needs to answer when joining the room. The question may be, for example, a nickname of a creator of the information exchange virtual room. In this case, the answer to the question is the password. The password and the question may be automatically generated by the client, or may be set by the creator.

Limited verification may include joining the information exchange virtual room only by using a join invitation link transmitted by the creator of the information exchange virtual room. The join invitation link may be time-sensitive, so as to further enhance privacy of the information exchange virtual room. A password in this encryption manner is set by the terminal, password verification is performed when the user taps the join invitation link, and the user does not need to perform a verification operation, which may simplify an operation.

Figure 5:
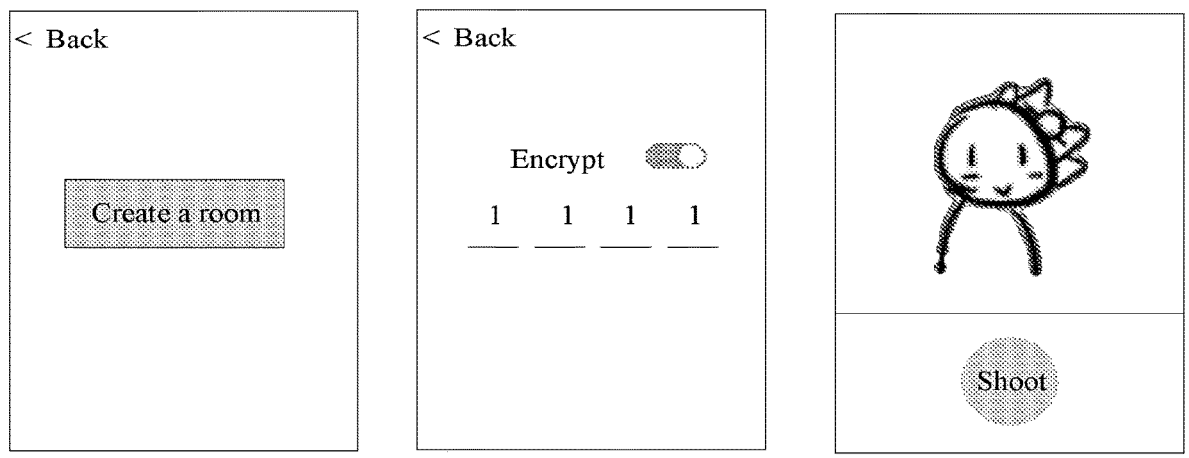
FIG. 5 is an exemplary schematic diagram of another partial page operation of an image capturing method according to an embodiment of this disclosure.

As shown in FIG. 5, Xiao A wants to create an information exchange virtual room. On a room setting page of a shooting application client, if Xiao A taps a room join control in a button form, the shooting application client displays an authentication control (whether to encrypt a button and a password input box in the figure). After Xiao A triggers the encryption button and inputs a set password (1111 in the figure) in the password input box, the shooting application sets a character collected from the input box as a password of the information exchange virtual room, and displays a user operation page of the created information exchange virtual room. The user operation page includes a member image of Xiao A.

In an embodiment, the step of "displaying an authentication control based on the trigger operation for the room creation control" may include: displaying a room member quantity control and the authentication control based on the trigger operation for the room creation control, the room member quantity control being configured to set a quantity threshold of room members in the information exchange virtual room.

The quantity threshold of room members is a maximum quantity of room members that can be accommodated in the information exchange virtual room.

In an embodiment, the displaying a room member quantity control and the authentication control based on the trigger operation for the room creation control includes: displaying the room member quantity control based on the trigger operation for the room creation control; and setting the quantity threshold of room members in the created information exchange virtual room when detecting that a setting operation for the room member quantity control is completed, and displaying the authentication control.

In this embodiment, the room member quantity control and the authentication control may also be displayed at the same time, that is, the room member quantity control and the authentication control are displayed based on the trigger operation for the room creation control. In addition, it is to be understood that the setting of the display sequence of each type of control that can be implemented is a possible implementation of this solution, and may be specifically flexibly set with reference to an actual requirement. Details are not described herein.

The room member quantity control may be used for setting a maximum value for the quantity of room members in the information exchange virtual room, and when an information exchange virtual room is created, a maximum value of a quantity of room members in the information exchange virtual room may be set based on a personalized requirement of a room member or an objective condition (such as performance of data processing performed by a computer device or a network status).

There may be multiple forms of the room member quantity control, which may be an input box, where the creator of the information exchange virtual room may directly input a value, and the client may limit the input value, and a limitation manner may include: not displaying a value that cannot be inputted; may be a data selection control, where a selectable value creator defined by a client in the data selection control may perform a value selection operation; or may be multiple data buttons, where several buttons are displayed on the client, each button corresponds to one value, and the creator can tap the selected button.

Setting the room member quantity control may make the solution more reliable in technical implementation, and also consider a member requirement, thereby facilitating smooth implementation of online image capturing.

Figure 6:
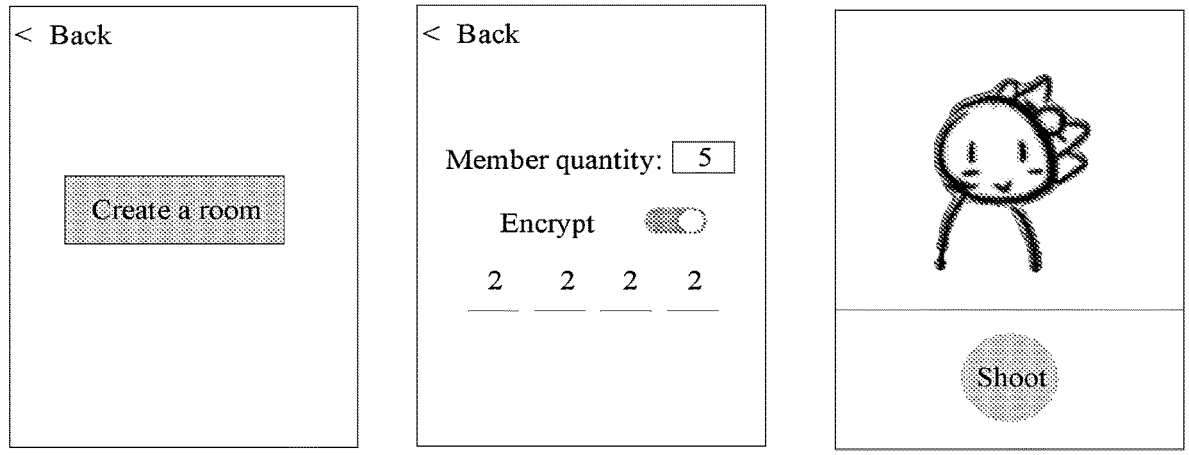
FIG. 6 is an exemplary schematic diagram of another partial page operation of an image capturing method according to an embodiment of this disclosure.

As shown in FIG. 6, Xiao A wants to create an information exchange virtual room. On a room setting page of a shooting application client, when Xiao A taps a room join control in a button form, a room member quantity control (the room member quantity control is the quantity input box in the figure) and an authentication control (an encryption button and a password input box in the figure) are displayed. When an operation on the quantity input box (5 is inputted in the figure) by Xiao A is completed, the shooting application saves a quantity obtained from the quantity input box and sets the quantity as a quantity threshold of members in the information exchange virtual room. When an operation on the encryption button and the password input box (2222 is inputted in the figure) by Xiao A is completed, the shooting application saves a character obtained from the password input box and sets the character as the password of the information exchange virtual room, and then displays a user operation page of the information exchange virtual room, the user operation page including a member image of Xiao A.

In an embodiment, the step of "displaying a user operation page of an information exchange virtual room of a client" may include: displaying a room join page of a client, the room join page including a room join entry of the created information exchange virtual room; and adding a room member identifier of the client to the specified information exchange virtual room based on a trigger operation for the room join entry, and displaying a user operation page of the joined information exchange virtual room.

The room join entry is a trigger entry used for adding a member to the room.

In an embodiment, the room join entry may be in one-to-one correspondence with the created information exchange virtual room. That is, a created information exchange virtual room corresponds to one room join entry. In this way, the user may trigger a room join entry of an information exchange virtual room to which the user wants to join, that is, the user may request to join the information exchange virtual room without inputting a specific room identifier.

In one embodiment, multiple created information exchange virtual rooms may correspond to one room join entry. All created information exchange virtual rooms may be corresponding to one room join entry, or some created information exchange virtual rooms may be corresponding to one room join entry, so that all created information exchange virtual rooms are corresponding to no less than two room join entries, and a correspondence between the room join entry and the created information exchange virtual room is not limited herein.

In an embodiment, the room join entry may include a room join control and a room identifier input control. That is, the room join control and the room identifier input control may be displayed together in the room join entry. The user can specify the room identifier to be joined in the room identifier input control, and then trigger the room join control to request to join the information exchange virtual room.

In an embodiment, the room join entry may also include a room join control. The adding a room member identifier of the client to the specified information exchange virtual room based on a trigger operation for the room join entry, and displaying a user operation page of the joined information exchange virtual room includes displaying a room join page of a client, the room join page including a room join control of the created information exchange virtual room; displaying a room identifier input control when a trigger operation for the room join control is detected; and adding, based on an input operation for the room identifier input control, the room member identifier of the client to an information exchange virtual room corresponding to an inputted room identifier, and displaying a user operation page of the joined information exchange virtual room.

The room join page may provide an interface for a user who wants to join a created information exchange virtual room to join the room, and there may be multiple room join interfaces. For example, the room join page may include interfaces of several recommended information exchange virtual rooms. A newcomer (e.g., a user who wants to join a created information exchange virtual room) may tap, according to introduction information of a recommended room (e.g., a recommended information exchange virtual room), an interface of a selected recommended room to join the selected recommended room, and the recommended information exchange virtual room may include an information exchange virtual room that is uniquely set for a member image display policy (e.g., the member image display policy may be used for obtaining an interesting or a good-looking preview image), or an information exchange virtual room that includes a specific member image (e.g., the member image may include a well-known person or a natural view). Therefore, a more interesting preview image may be obtained, thereby significantly improving interestingness of image capturing.

Figure 7:
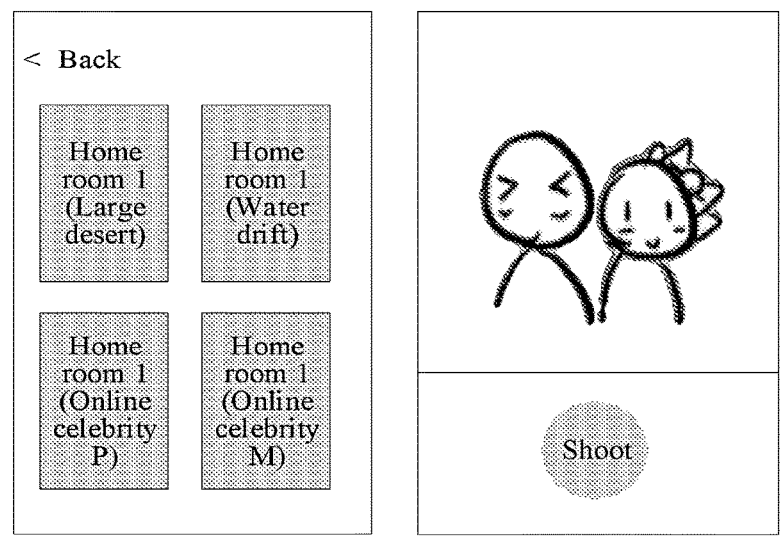
FIG. 7 is an exemplary schematic diagram of another partial page operation of an image capturing method according to an embodiment of this disclosure.

As shown in FIG. 7, Xiao B wants to join an information exchange virtual room to shoot an idea image. A room join page includes four front-page rooms (e.g., recommended information exchange virtual rooms). Xiao B taps front-page room 4, and may be shot with online celebrity M in front-page room 4. A preview image of room 4 includes objects online celebrity M (the girl in the preview image) and Xiao B (the boy in the preview image).

For another example, the room join interface may include a room join control. When the newcomer triggers the room join control, the client of the shooting application displays a room identifier input control, determines, based on an input operation of the newcomer for the room identifier input control, an information exchange virtual room corresponding to an inputted room identifier, adds a room member identifier of the newcomer to the information exchange virtual room corresponding to the inputted room identifier, and displays a user operation page of the information exchange virtual room. By setting the room join control, the newcomer can conveniently enter the information exchange virtual room, thereby facilitating smooth implementation of image capturing.

Figure 8:
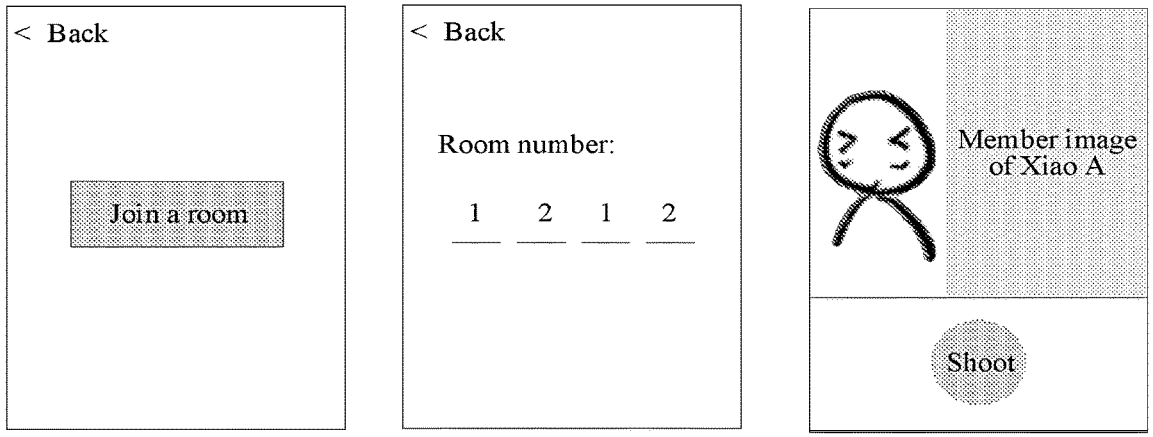
FIG. 8 is an exemplary schematic diagram of another partial page operation of an image capturing method according to an embodiment of this disclosure.

As shown in FIG. 8, Xiao B wants to join an information exchange virtual room. Xiao B triggers a room join control on a room join page (a room join button in the figure), and displays a room identifier input control (a text "room number" and a character input box in the figure). When an input operation of Xiao B for the room identifier input control is completed, Xiao B joins an information exchange virtual room corresponding to the room identifier, and the shooting application client displays a user operation page of the information exchange virtual room. The user operation page includes a member image of previously joined Xiao A and a member image of Xiao B (the member image of Xiao B is a boy).

In an embodiment, the step of "adding, based on an input operation for the room identifier input control, the room member identifier of the client to an information exchange virtual room corresponding to an inputted room identifier, and displaying a user operation page of the joined information exchange virtual room" may include displaying, based on the input operation for the room identifier input control, an authentication information input control of the information exchange virtual room corresponding to the inputted room identifier; and adding, when authentication information inputted based on the authentication information input control passes verification, the room member identifier of the client to the information exchange virtual room corresponding to the room identifier, and displaying a user operation page of the information exchange virtual room.

The authentication information input control may be used for verifying a newcomer, or may be used for verifying password information of an information exchange virtual room to which the newcomer wants to join. For example, if a creator of an information exchange virtual room presets a preset room member that can join the room for this information exchange virtual room, when the newcomer completes an input operation for a room identifier input control, the application client may determine, according to an inputted room identifier, the information exchange virtual room to which the newcomer wants to join. If the newcomer is a preset room member, to verify whether the operation object of the newcomer on the client is the owner of the newcomer, it is required to verify the operation object by using an authentication information input control, and the authentication information input control may prompt the operation object to input information, and receive password, fingerprint, face, or fingerprint information that is inputted by the operation object and that can be used for identity verification. The application client then processes the information, and concludes that when it is concluded that the operation object is the owner of the newcomer, the application client may determine that the newcomer passes verification, and display the user operation page of the information exchange virtual room.

For another example, the authentication information input control may be used for verifying password information of the information exchange virtual room to which the newcomer wants to join. For example, the authentication information input control may receive inputted authentication information such as a password of the information exchange virtual room to which the newcomer wants to join, or a question answer that is used for verification. When the inputted authentication information passes verification, the newcomer may join the information exchange virtual room, and the client may display a user operation page of the information exchange virtual room.

The authentication information input control receives the inputted authentication information, and performs verification according to the inputted authentication information, thereby effectively improving security of an information exchange virtual room that has an encryption requirement.

Figure 9:
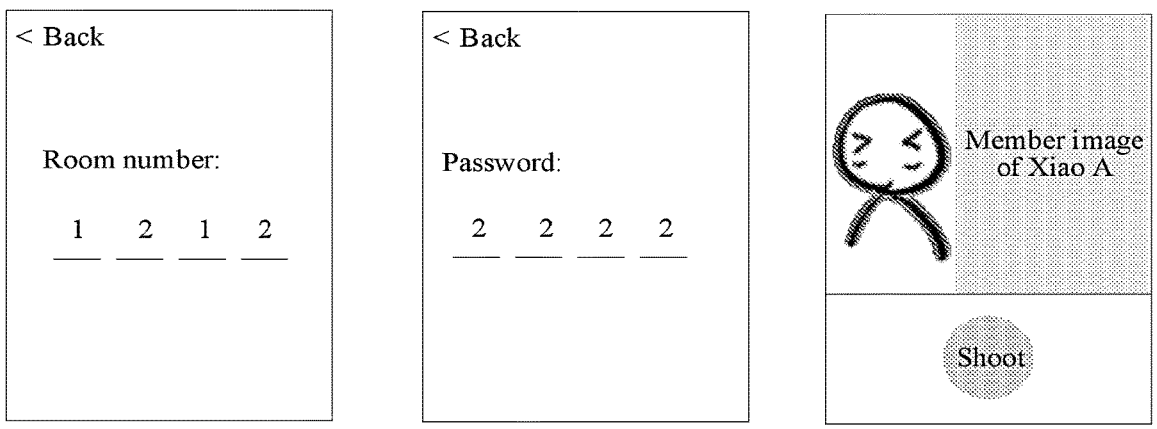
FIG. 9 is an exemplary schematic diagram of another partial page operation of an image capturing method according to an embodiment of this disclosure.

For example, in FIG. 9, when Xiao B completes an input operation (room number 1212 inputted in the figure) on a room identifier input control (a text "room number" and a character input box in the figure), an authentication information input control (a text "password" and a character input box in the figure) is displayed. When Xiao B completes an input operation on the authentication information input control (password 2222 is inputted in the figure), and passes verification, Xiao B joins an information exchange virtual room corresponding to the inputted room identifier, and the shooting application client displays a user operation page of the information exchange virtual room. The user operation page includes a member image of previously joined Xiao A and a member image of Xiao B (the member image of Xiao B is a boy).

In an embodiment, the image region includes at least two image sub-regions, and the step of "displaying a user operation page of an information exchange virtual room of a client" may include acquiring a mapping relationship between an image sub-region and a room member; and displaying the user operation page of the information exchange virtual room based on the mapping relationship, the user operation page including an image region, the image region including at least two image sub-regions, and a preview image in the image sub-region including a member image of a room member corresponding to the image sub-region (i.e., having a mapping relationship).

The image sub-region is a part of the image region, the image sub-region corresponds to a member object, the mapping relationship is a relationship between the image sub-region and the room member, and each member image belongs to one room member. Therefore, an image sub-region corresponding to each member image may be determined by using the mapping relationship, the image region includes an image sub-region, and the image region includes a preview image. Therefore, the preview image includes a member image. A relative location of the image sub-region in the image region and a first mapping relationship between the image sub-region and the room member may be set by the application client, or may be set by a room member in an information exchange virtual room, or the like.

The application client may jointly determine a relative location of the image sub-region in the image region according to a preset display mode, such as a multi-grid mode (an area of each image sub-region is the same, a shape of each image sub-region is the same, and there is no overlapping part between every two image sub-regions) or a same-screen mode (an overlapping part may exist between image sub-regions), and a quantity of room members, and then determine a first mapping relationship between the room member and the image sub-region according to a time point at which each room member joins the information exchange virtual room.

For example, if the preset display mode is the multi-grid mode, and room members includes Xiao A (creator) and Xiao B, that is, the quantity of room members is 2, the left half of the image region is allocated as an image sub-region of Xiao A, and the right half of the image region is allocated as an image sub-region of Xiao B. If the preset display mode is the same-screen mode, and room members include Xiao A (creator) and Xiao B, that is, the quantity of room members is 2, the left ⅔ of the image region may be allocated as an image sub-region of Xiao A, the right ⅔ of the image region is allocated as an image sub-region of Xiao B, and the middle ⅓ of the image region is an overlapped part of the image sub-region of Xiao A and Xiao B. Because Xiao A is the creator, when image content of the member images is overlapped at the middle ⅓, the member image of Xiao A is placed on the upper layer.

A relative location of the image sub-region in the image region and a first mapping relationship between the image sub-region and the room member are determined based on a manner of setting a room member, and may be implemented by setting a related control in the information exchange virtual room by the room member. In this manner, personalized requirements of the room member are better met, and the room member can enjoy more freedom to play, thereby increasing interestingness of the presented preview image, that is, increasing interestingness of image capturing.

In step 202, when a trigger operation for the shooting control is detected, image capturing can be performed on the preview image. In an example, image capturing of the preview image is performed when the shooting control element is selected.

The trigger operation for the shooting control may include different types of trigger operations. The trigger operation depends on the shooting control. For example, when the shooting control is a trigger shooting control, tapping the trigger shooting control is the trigger operation. When the shooting control is an intelligent shooting control, the trigger operation may be a specific or non-specific voice, expression, or action. The terminal detects a compliant trigger operation corresponding to the shooting control, and may perform image capturing on the preview image.

When the trigger operation for the shooting control is detected, image capturing may be performed on the preview image, or after the trigger operation for the shooting control is detected, the preview image is shot at a set time interval, and then the preview image is shot. The set time interval may be set by a room user, or may be preset by an application. In addition, image capturing may include capturing of a single image, capturing of multiple images, or capturing of a video image. For example, the user operation page may include a trigger shooting control, a continuous shooting control, and a video recording control. The room user may select a corresponding control according to a personal requirement, and then the terminal may perform corresponding shooting according to the trigger operation.

Image capturing is performed on the preview image based on the trigger operation, and image content displayed on the preview image page by the room member may be saved, so as to implement image capturing.

For example, a user operation page of Xiao A includes an image region and a function region, and display content of a preview image included in the image region is a cat sitting on a chair and having a pine tree above, and the function region includes a shooting control. When a trigger operation on the shooting control by Xiao A is detected, the shooting application performs image capturing on the preview image.

In step 203, a captured image is output. In an example, a captured image that is generated based on the preview image is output.

The outputting the captured image (which may be referred to as a target image), or shot image, may be saving the target image to a terminal to which an application of each room member of the information exchange virtual room belongs. The room member may view the target image on the terminal, and an interface (such as a button) that can directly perform a viewing operation on the captured target image may be disposed on a page of the information exchange virtual room. Alternatively, the target image may be displayed on the page of the information exchange virtual room, and a corresponding save control is set on the page displaying the target image, so that the room member can conveniently save the target image, and so on.

For example, after the shooting control is triggered by Xiao A, the shooting application displays the captured image on the page of the information exchange virtual room, so as to facilitate viewing by Xiao A.

In an embodiment, the user operation page further includes a preview image effect control, and the image capturing method may further include implementing a corresponding image effect for the preview image based on an operation for the preview image effect control.

In this embodiment, the step of "performing image capturing on the preview image when a trigger operation for the shooting control is detected" may include performing, when the trigger operation for the shooting control is detected, image capturing on the preview image obtained after the image effect is implemented.

The image effect may include modifying display content in the preview image to obtain a more interesting, personal, and beautiful preview image. The modified display content may include multiple aspects, such as a tone, a filter, a display special effect, or a background of the entire preview image. Alternatively, a part of the preview image may be modified, for example, an object in the preview image; and so on.

The preview image effect control may include a control set formed by several controls. The controls in the control set may be in a parallel relationship or a progressive relationship. A setting manner and a display manner of the control may be flexibly set according to an actual requirement.

Setting the preview image effect control for the preview image may enable the room member to perform more personalized modification and operation on the preview image, thereby improving interestingness of image capturing.

Figure 10:
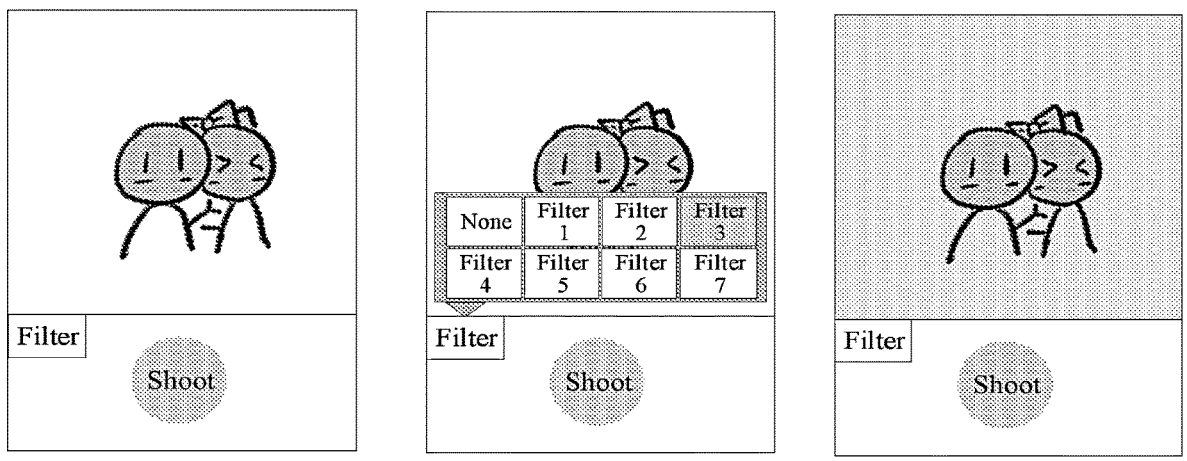
FIG. 10 is an exemplary schematic diagram of another partial page operation of an image capturing method according to an embodiment of this disclosure.

For example, referring to FIG. 10, a function region of a user operation page includes a preview image effect control (a filter button in the figure) for a preview image. After a room Xiao A performs a trigger operation on the filter button, a preset filter button (a filter 1 to a filter 7 in the figure) is displayed on the user operation page. After the filter 3 is selected, a preview image of an image region of the user operation page is added with an image effect corresponding to the filter 3.

In an embodiment, to further improve interestingness of image capturing and meet a requirement for setting a personalized image effect of the preview image, the preview image effect control includes a member image effect control, and the step of "implementing a corresponding image effect for the preview image based on an operation for the preview image effect control" may include displaying, based on a setting operation for the member image effect control, an effect range control corresponding to an inputted target member effect; and implementing, for a corresponding member image, an image effect corresponding to the target member effect when detecting that a setting operation for the effect range control is completed.

The member image effect control may include a control that can modify a member image in the preview image, or may include a control that can modify an object in the member image, and the like. The member image effect control belongs to a type of the preview image effect control. Therefore, similar to the preview image effect control, the member image effect control may include a control set formed by several controls. The controls in the control set may be in a parallel relationship or a progressive relationship. A setting manner and a display manner of the control may be flexibly set according to an actual requirement.

Figure 11:
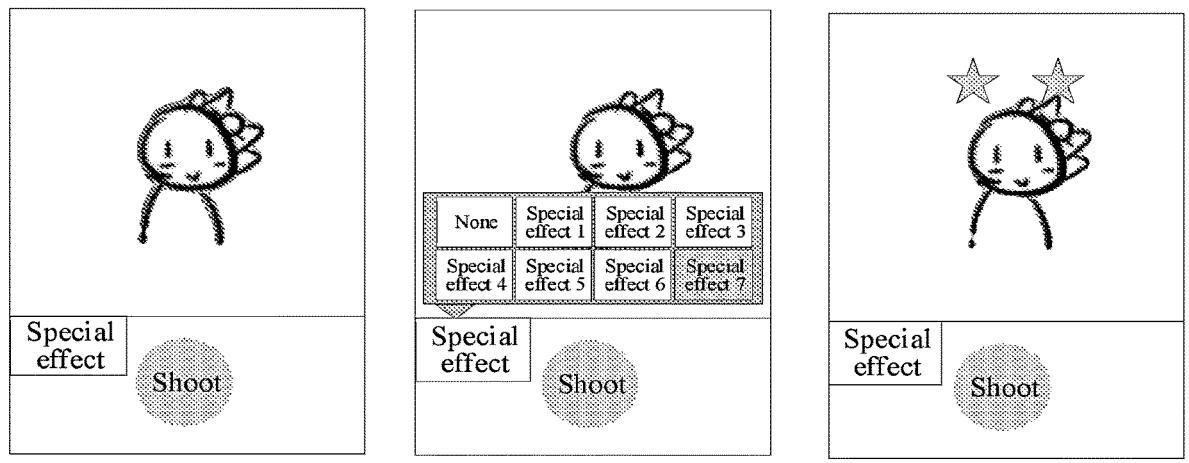
FIG. 11 is an exemplary schematic diagram of another partial page operation of an image capturing method according to an embodiment of this disclosure.

For example, referring to FIG. 11, a function region of a user operation page includes a member image effect control (a special effect button in the figure) for a preview image. After a room Xiao A performs a trigger operation on the special effect button, a preset special effect button is displayed on the user operation page (a special effect 1 to a special effect 7 in the figure), and after Xiao A performs a selection operation on the special effect 7, an object (a girl) in the preview image of the user operation page is added with an image effect corresponding to the special effect 7 (two pentagrams on the girl's head).

In an embodiment, the effect range control includes at least one of an all member control, a partial member control, and a local member control.

In an embodiment, to further improve a personalized image effect in image capturing, the effect range control includes an all member control, and the member image includes a local member image collected by a local terminal in real time. The step of "implementing, for a corresponding member image, an image effect corresponding to the target member effect when detecting that a setting operation for the effect range control is completed" may include implementing the image effect corresponding to the target member effect for all member images of the image region when a selected operation for the all member control is detected.

In an embodiment, the effect range control includes a partial member control. The step of "implementing, for a corresponding member image, an image effect corresponding to the target member effect when detecting that a setting operation for the effect range control is completed" may include implementing the image effect corresponding to the target member effect for selected member images of the image region when a selected operation for the partial member control is detected.

In an embodiment, the effect range control includes a local member control. The step of "implementing, for a corresponding member image, an image effect corresponding to the target member effect when detecting that a setting operation for the effect range control is completed" may include implementing the image effect corresponding to the target member effect for the local member image of the image region when a selected operation for the local member control is detected.

Figure 12:
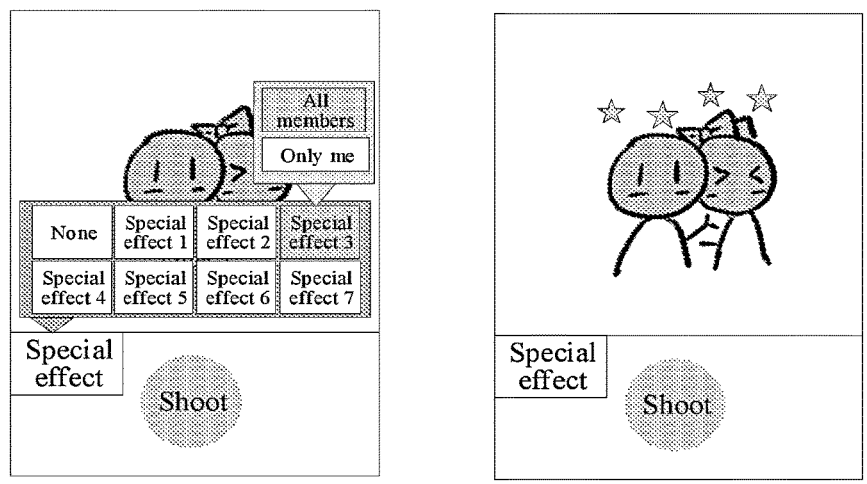
FIG. 12 is an exemplary schematic diagram of another partial page operation of an image capturing method according to an embodiment of this disclosure.

For example, referring to FIG. 12, after a display operation of Xiao A (a member image of Xiao A is the girl in the figure) for a member image effect control (a special effect 3 button in the figure) is completed, a shooting application client displays an all member control (the all member button in the figure) and a local member control (the only me button in the figure). When Xiao A selects the all member button, the shooting application client adds the image effect (two pentagrams on the girl's head and two pentagrams on the boy's head) corresponding to the special effect 3 to the objects (the girl and boy) in the preview image of the user operation page.

Figure 13:
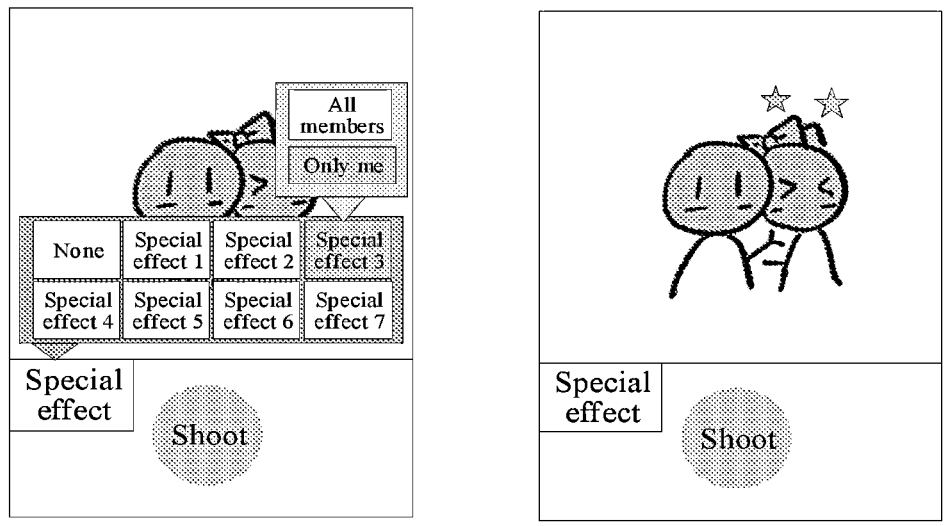
FIG. 13 is an exemplary schematic diagram of another partial page operation of an image capturing method according to an embodiment of this disclosure.

For example, referring to FIG. 13, after a display operation of Xiao A (the girl in an object image in a member image of Xiao A) for a member image effect control (a special effect 3 button in the figure) is completed, a shooting application client displays an all member control (the all member button in the figure) and a local member control (the only me button in the figure). When Xiao A selects the only me button, the shooting application client adds the image effect (two pentagrams on the girl's head) corresponding to the special effect 3 to the member image of Xiao A (the girl) in the preview image of the user operation page.

In an embodiment, the outputting a captured image, or a shot image, includes displaying an image preview page, the image preview page including the captured image and an image editing control; and displaying, in real time on the image preview page, an editing effect of the captured image based on an editing operation for the image editing control by the room member.

In this embodiment, outputting a captured image may be displaying an image preview page on a page of an information exchange virtual room, the image preview page includes the captured image and an image editing control, and the image editing control may edit the captured image. For example, graffiti and stickers may be applied to the image, and different editing manners may correspond to different image editing controls. In this case, all room members in the information exchange virtual room may perform an editing operation. In addition, editing operations of all room members are displayed in real time on a user operation page of each room member. After an operation is completed, each room member may save an image obtained after editing. The image editing control is added, so that the room members edit the captured image at the same time, which greatly improves interaction and interestingness of image capturing.

Figure 14:
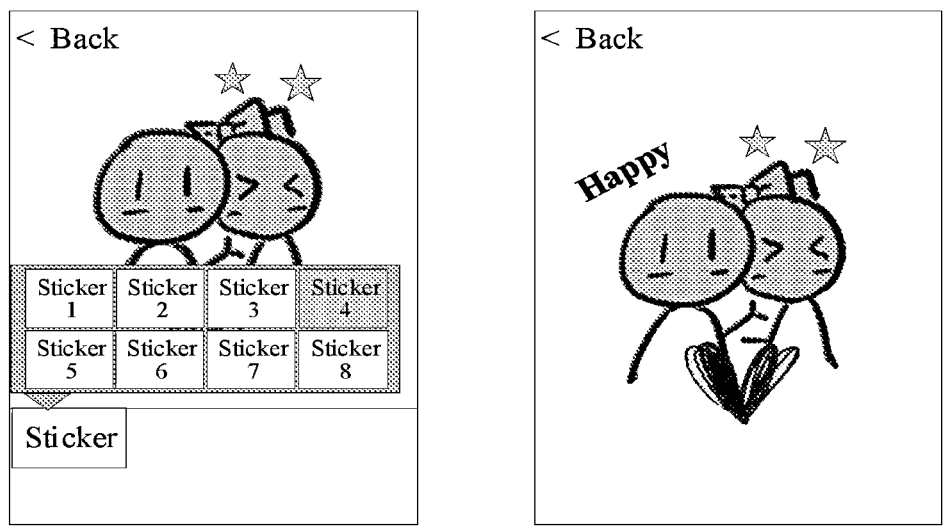
FIG. 14 is an exemplary schematic diagram of another partial page operation of an image capturing method according to an embodiment of this disclosure.

For example, referring to FIG. 14, after Xiao A triggers an image editing control (the sticker button in the figure) on an image preview page, a preset sticker button is displayed on the image preview page (a sticker 1 to a sticker 7 in the figure). After Xiao A selects the sticker 4, the sticker 4 is displayed on the page ("happy" in the figure). In addition, when Xiao A performs an operation, a room member Xiao C in the information exchange virtual room also performs image editing, and an operation of Xiao C is displayed on the image preview page in real time (heart graffiti in the figure).

In an embodiment, the image preview page may be displayed after the captured image is outputted. For example, after the captured image is outputted, the user may perform an image preview operation to trigger display of the image preview page.

In an embodiment, the image capturing method further includes acquiring an image collected in real time by a local terminal; extracting a local member image in the real-time collected image and location information of the local member image in the real-time collected image; transmitting the local member image and the location information of the local member image to a server; and receiving a preview image returned by the server based on the local member image and the location information of the local member image, the preview image including member images of at least two room members.

The local member image may include an image obtained by performing a related operation on the image collected in real time by the local terminal. The local member image includes content that the room member of the terminal wants to display in the preview image. Specifically, the local member image may be extracted from the real-time collected image. It may be determined, according to an actual environment and a shooting requirement, how to extract the image. If there is a case in which the real-time collected image needs to be retained, the real-time collected image may be directly used as a local member image without performing extraction, or the real-time collected image may be modified. For example, only an object (such as a person or an article) in the real-time collected image is retained as a local member image, or some content in the real-time collected image is deleted, and the image on which the deletion operation is performed is used as a local member image. How to extract the image may be flexibly set by a room member of the terminal.

For example, for room member Xiao C in an information exchange virtual room, a terminal of Xiao C collects an image in real time, and the real-time collected image may include an object. The terminal may extract a local member image (which may be an image of an object) in the real-time collected image, determine location information of the member image in the real-time collected image, and then transmit the local member image and the location information to a server. The server may determine a sub-region of the room member, and after receiving the member image and the location information of the member image in the information exchange virtual room, determine a determined location of the member image in the preview image in the sub-region according to the location information, and renders the member image to the location. Then, the server returns the preview image that renders the member image to the terminal, and the terminal displays the image in the image region of the user operation page.

In addition, the terminal of Xiao C may also directly receive a member image of another room member in the information exchange virtual room and location information of the image, determine a corresponding sub-region of each room member, determine a determined location of each member image including the local member image in the preview image according to a relative location of the image, render the image to obtain the preview image, and display the preview image in the image region of the user operation page.

This embodiment of this disclosure first displays a user operation page of an information exchange virtual room of a client, where the user operation page includes a shooting control and an image region, the image region includes a preview image, and the preview image includes member images of at least two room members. When a trigger operation for the shooting control is detected, image capturing is performed on the preview image, and finally a captured image is outputted. In the solution of this disclosure, an information exchange virtual room may be used as a medium, so that at least two room members can perform image capturing in a preview image.

According to the method described in the foregoing embodiments, the following further provides detailed description by using examples.

In this embodiment, that content of a member image is a human image is used as an example, and three room members of an information exchange virtual room are used as an example to describe an image capturing method in detail.

Figure 15:
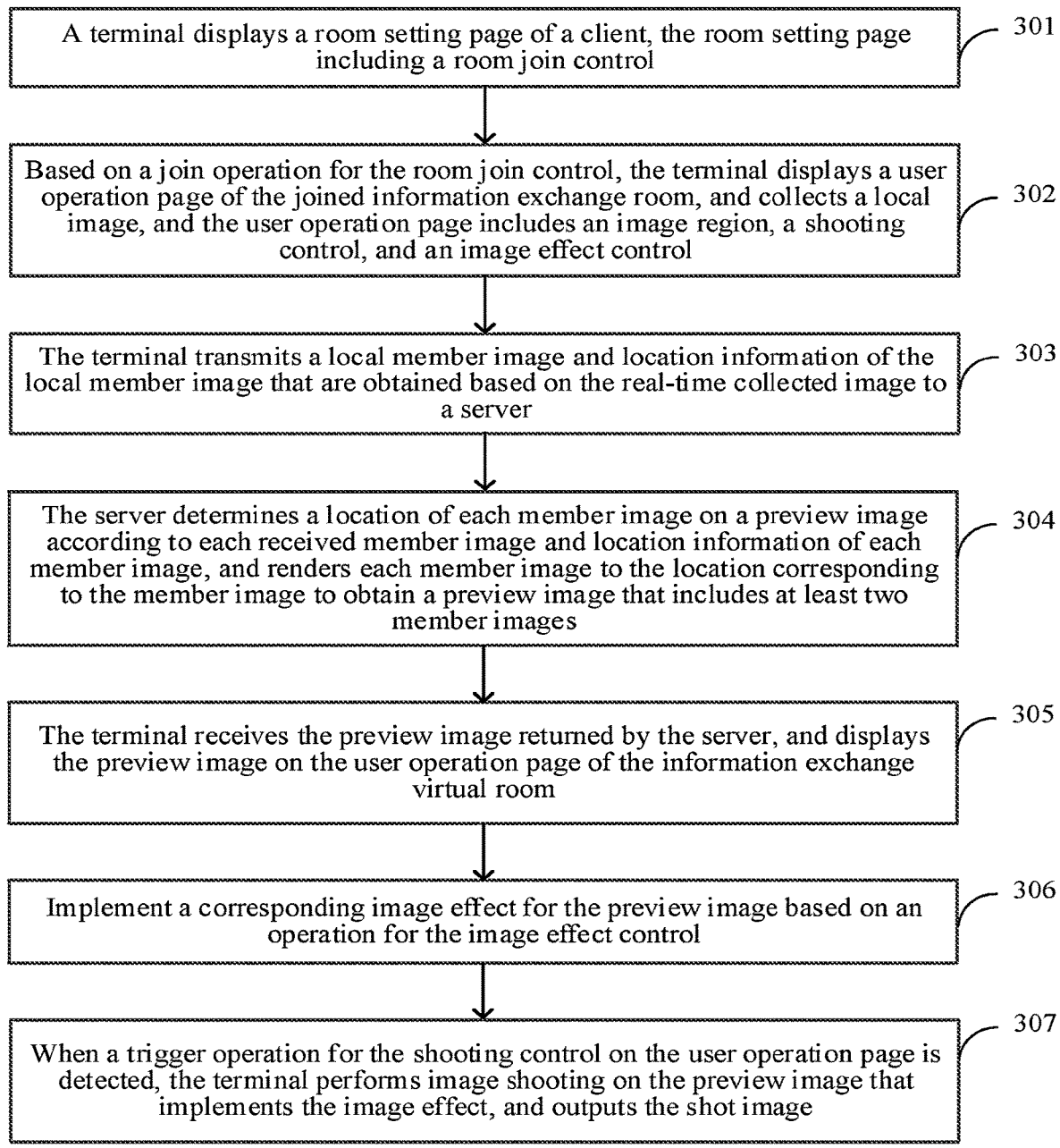
FIG. 15 is another exemplary schematic flowchart of an image capturing method according to an embodiment of this disclosure.

An embodiment of this disclosure provides an image capturing method. As shown in FIG. 15, a procedure of the image v method may be as follows:

In step 301, a terminal displays a room setting page of a client, the room setting page including a room join control.

Figure 16:
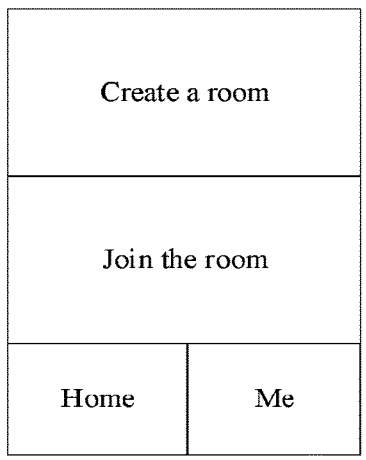
FIG. 16 is an exemplary schematic diagram of another partial page operation of an image capturing method according to an embodiment of this disclosure.
Figure 16:
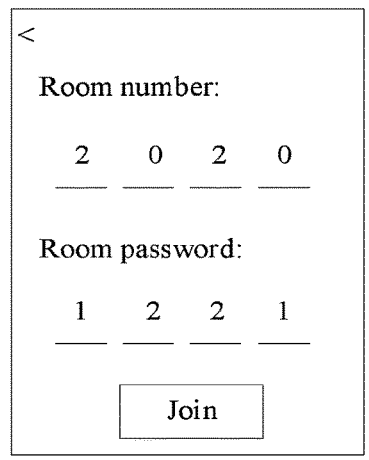
Figure 16:
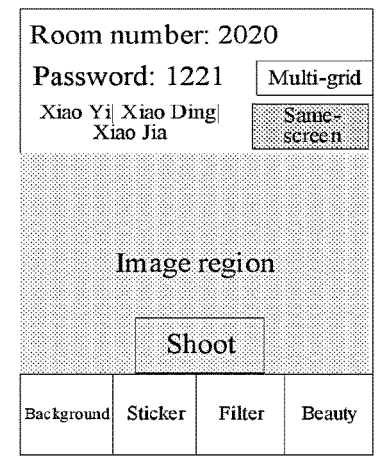

For example, FIG. 16 is a room setting page of a client, and the room setting page is a room setting page of user Xiao Jia of an application PP. The room setting page includes a room join control (the join room button in the figure), and further includes a create button used for creating a room, and may point to a home button of the PP home page, and may point to My button of personal information of Xiao Jia. Xiao Jia wants to join an information exchange virtual room created by Xiao Yi (Xiao Yi creates a purikura room, and the purikura room is a room in which voice can be made and a purikura can be shot).

Based on the join operation for the room join control, the terminal displays a user operation page of the joined information exchange virtual room, and collects an image in real time, and the user operation page includes an image region, a shooting control, and an image effect control.

For example, as shown in FIG. 16, if Xiao Jia triggers the join room button, the PP client displays the room number and the room password input box. If Xiao Jia inputs 2020 in the room number input box, and inputs 1221 in the room password input box, and then Xiao Jia taps the OK button, the application PP determines that the join operation of Xiao Jia is completed according to the information inputted by Xiao Jia, and the user operation page of the purikura room is displayed. The user operation page includes a first function region, a shooting control (the shooting button in the figure), a second function region, and an image region. The first function region includes room information of the purikura room ("room number: 2020", "password: 1221", "Xiao Yi|Xiao Ding|Xiao Jia" in the figure), and a mode control (the multi-grid button and the same-screen button in the figure). The second function region includes an image effect control (the background button, the sticker button, the filter button, and the beauty button in the figure). In addition, PP invokes a camera on a terminal to which PP belongs to collect an image in real time.

In some embodiments, the image capturing method may further include:

The terminal displays a room setting page of a client, the room setting page including a room creation control; and the terminal displays a user operation page of a created information exchange virtual room based on a creation operation for the room creation control.

Figure 17:
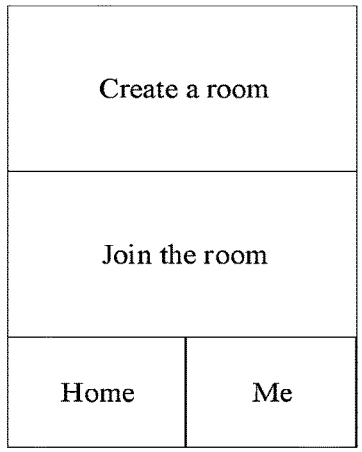
FIG. 17 is an exemplary schematic diagram of another partial page operation of an image capturing method according to an embodiment of this disclosure.
Figure 17:
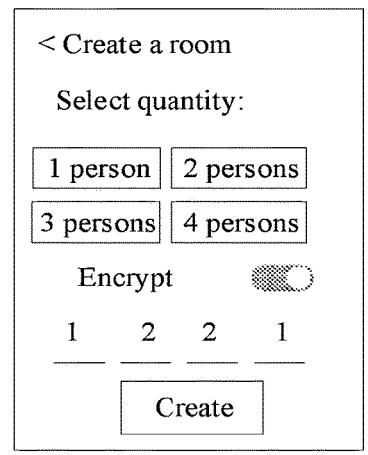
Figure 17:
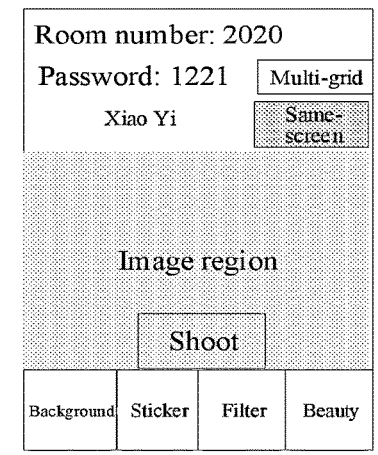

For example, if Xiao Yi wants to create a purikura room, as shown in FIG. 17, the room setting page of PP includes a room creation control (the room creation button in the figure). In this case, Xiao Yi can trigger the room creation button, and the PP client displays a person quantity selection control (four quantity buttons in the figure: 1 person button, 2 persons button, 3 persons button, and 4 persons button) and an authentication control (the encryption button and password input box in the figure). If Xiao Yi taps the 3 persons button and the encryption button and inputs 1221 in the password input box, Xiao Yi completes the operation of creating a purikura room. PP sets a room member quantity threshold in the room to 3 and the password of the room to 1221, generates a room number 2020 for the purikura room, and displays a user operation page of the purikura room.

The terminal transmits a local member image and location information of the local member image that are obtained based on the real-time collected image to the server.

For example, PP of Xiao Jia processes the collected image. The image includes an environment around a girl and the girl, PP extracts the girl image in the collected image as a member image, and determines location information of the girl on the collected image, and PP of Xiao Jia transmits the girl image and the location information of the girl image to the server.

The server determines a location of each member image on the preview image according to each received member image and location information of each member image, and renders each member image to the location corresponding to the member image to obtain a preview image that includes at least two member images.

For example, the server of PP successively (in a sequence of Xiao Yi, Xiao Ding, and Xiao Jia) receives member images and relative locations of three room members in the purikura room, determines a location of each room member on the preview image according to the same-screen mode selected for the purikura room and a relative location of a member image of each room member, and renders each member image to the location corresponding to the member image to obtain a preview image.

The terminal receives the preview image returned by the server, and displays the preview image on the user operation page of the information exchange virtual room.

Figure 18:
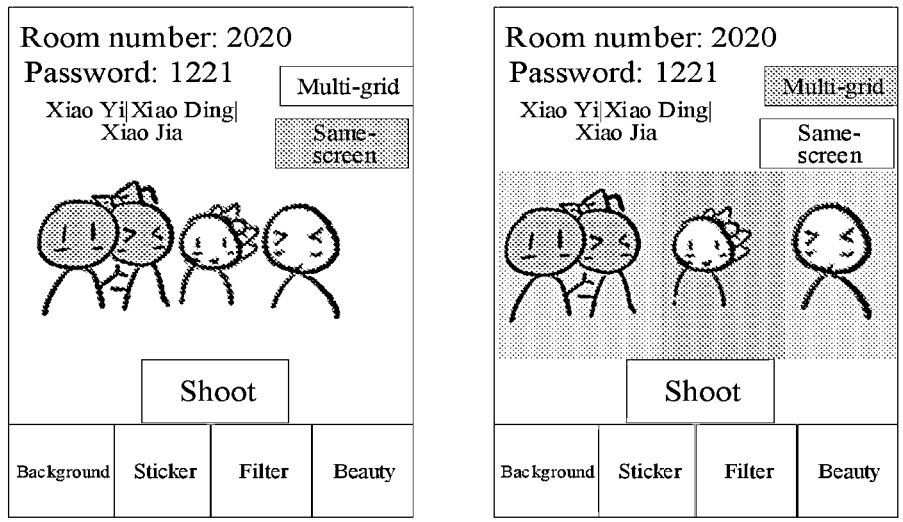
FIG. 18 is an exemplary schematic diagram of another partial page operation of an image capturing method according to an embodiment of this disclosure.

As shown in the left figure of FIG. 18, an image region of a user operation page displays a preview image, and currently displayed is a preview image in a same-screen mode (four objects of three room members in the figure present a shoulder-to-shoulder effect). If the mode is switched to a grid mode, as shown in the right figure of FIG. 18, a preview image in the grid mode is displayed (a specific region of the preview image in which the member images of the three room members in the figure are interfered with each other).

A corresponding image effect for the preview image is implemented based on an operation for the image effect control.

Figure 19:
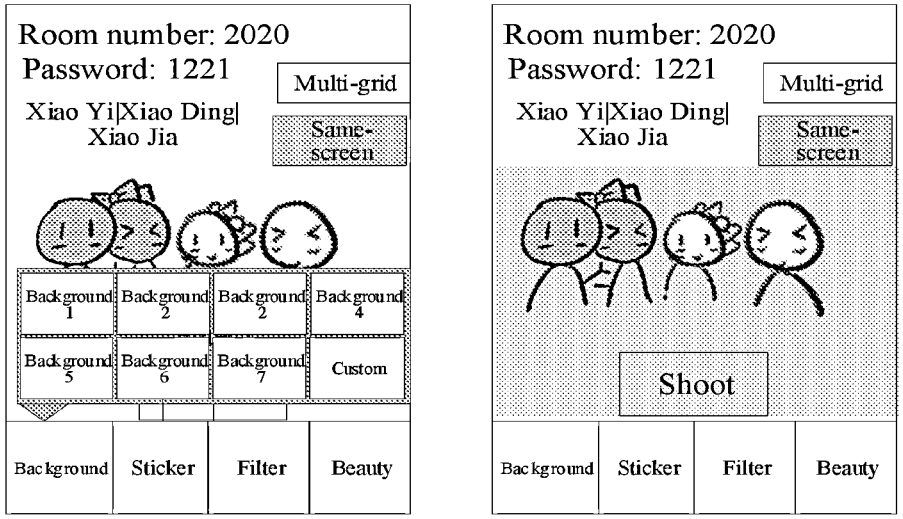
FIG. 19 is an exemplary schematic diagram of another partial page operation of an image capturing method according to an embodiment of this disclosure.

For example, referring to FIG. 19, the preview image includes a second function region that includes an image effect control (the background button, the sticker button, the filter button, and the beauty button in the figure). After Xiao Jia taps the background button, a preset background button (background 1 to background 7 in the figure) and a custom button are displayed, and then Xiao Jia taps background 2. In this case, the background of the preview image is set to a color corresponding to background 2.

An action range of the image effect control may vary with a mode selected by a room user (a same-screen mode or a grid mode), or may vary with a setting of the room user, and may be flexibly processed in practice.

When a trigger operation for the shooting control on the user operation page is detected, the terminal performs image capturing on the preview image that implements the image effect, and outputs the captured image.

Figure 20:
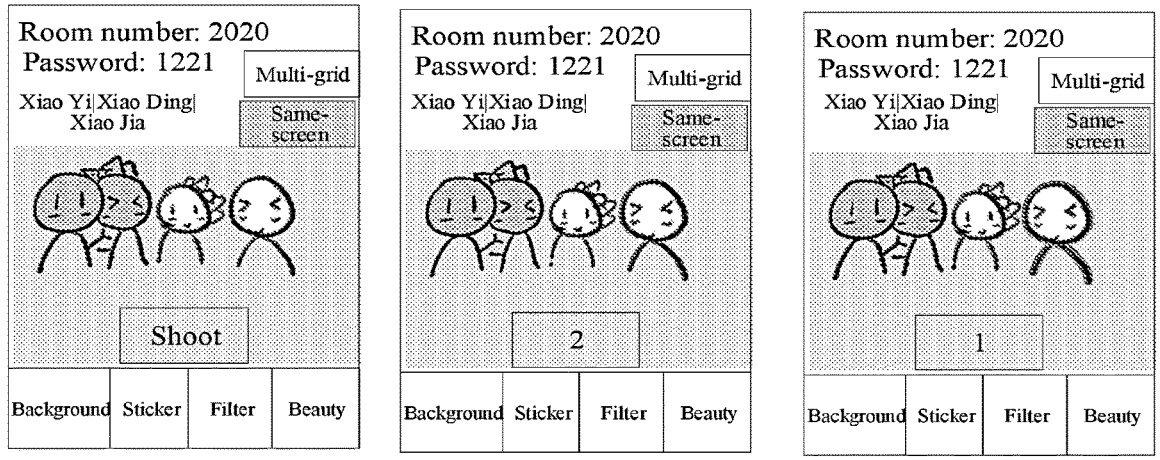
FIG. 20 is an exemplary schematic diagram of another partial page operation of an image capturing method according to an embodiment of this disclosure.

As shown in FIG. 20, a shooting control of a purikura room is a shooting button, and if Xiao Jia taps the shooting button, a countdown is displayed on the preview image, PP image capturing is performed after the countdown ends, and the captured image is displayed on a page of the purikura room. In addition, if Xiao Jia long presses the shooting button, PP may record a video, and finally outputs the recorded video.

Figure 21:
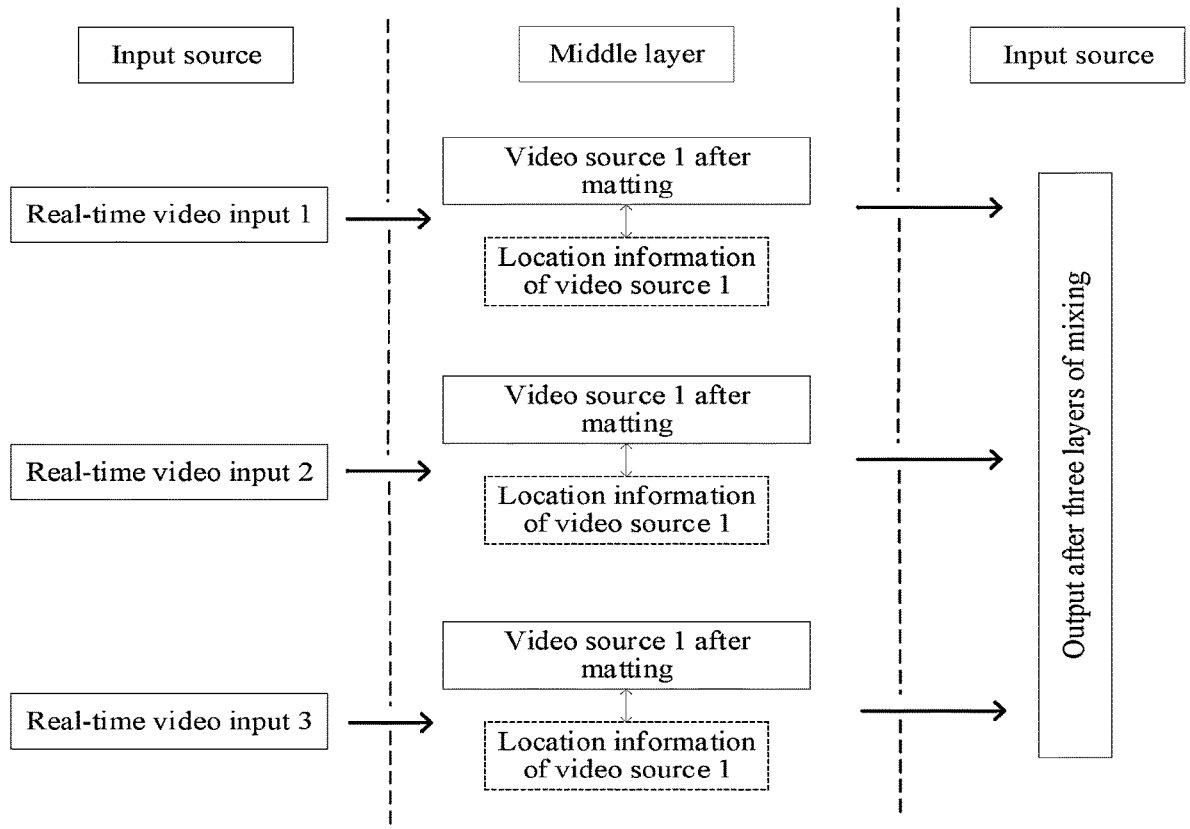
FIG. 21 is an example image of a technical implementation of an image capturing method according to an embodiment of this disclosure.

In an implementation process of this disclosure, a process of technology implementation may have multiple forms. For example, FIG. 21 provides an exemplary technology implementation. An input source may be a client of each room member, and an image collection module on a client performs real-time video collection (a video, that is, several frames of images, for example, images collected in real time), and matting processing is performed on the collected video at an intermediate layer to obtain a matted video (e.g., matted processing is performed on a real-time collected image to obtain a local member image), and location information (e.g., location information of the local member image in the real-time collected image) of the matted video is determined. Then, all matted videos and location information corresponding to the matted videos are input to an output layer, and the output layer combines and outputs the finally obtained preview image.

In this embodiment of this disclosure, a terminal displays a room setting page of a client, and the room setting page includes a room join control. Based on a join operation performed on the room join control, the terminal displays a user operation page of the joined information exchange virtual room, and collects an image in real time. The user operation page includes an image region, a shooting control, and an image effect control. The terminal transmits, to a server, a local member image and location information of the local member image that are obtained based on the real-time collected image, and the server determines, according to each received member image and a relative location thereof, a location of each member image on a preview image, and renders each member image to a location thereof, so as to obtain a preview image that includes at least two member images. The terminal receives a preview image returned by the server, displays the preview image on the user operation page of the information exchange virtual room, implements a corresponding image effect on the preview image based on the operation for the image effect control, and when detecting a trigger operation for the shooting control on the user operation page, the terminal performs image capturing on the preview image that implements the image effect, and outputs the captured image.

In this disclosure, a related image capturing manner may be extended, and even if the image capturing manner is not in the same real space, interesting image capturing may be performed by using a network.

To better implement the image capturing method provided in the embodiments of this disclosure, an embodiment of this disclosure further provides an apparatus based on the foregoing image capturing method. Terms have meanings the same as those in the foregoing face image capturing method. For exemplary implementation details, reference may be made to the description in the method embodiments.

Figure 22:
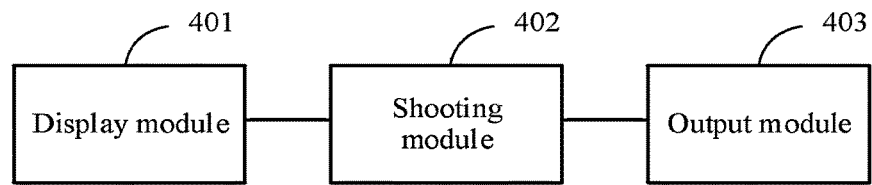
FIG. 22 is an exemplary block diagram of an image capturing apparatus according to an embodiment of this disclosure.

FIG. 22 is a block diagram of an image capturing apparatus according to an embodiment of this disclosure. The image capturing apparatus may include a display module 401, a shooting module 402, and an output module 403. One or more modules, submodules, and/or units of the apparatus can be implemented by processing circuitry, software, or a combination thereof, for example.

The display module 401 is configured to display a user operation page of an information exchange virtual room of a client, the user operation page including a shooting control and an image region, the image region including a preview image, and the preview image including member images of at least two room members.

The shooting module 402 is configured to: perform image capturing on the preview image when a trigger operation for the shooting control is detected.

The output module 403 is configured to output a captured, or shot, image.

Figure 23:
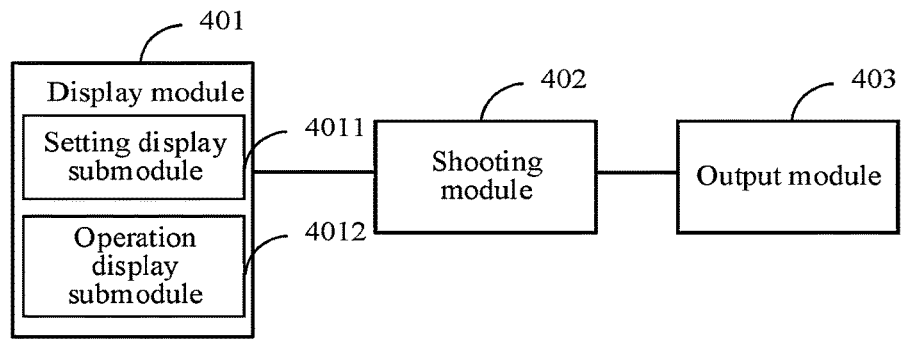
FIG. 23 is another exemplary block diagram of an image capturing apparatus according to an embodiment of this disclosure.

In some embodiments of this disclosure, as shown in FIG. 23, the display module 401 includes a setting display submodule 4011 and an operation display submodule 4012.

The setting display submodule 4011 is configured to display a room setting page of a client, the room setting page including a room creation control.

The operation display submodule 4012 is configured to display a user operation page of a created information exchange virtual room based on a trigger operation for the room creation control.

In some embodiments of this disclosure, the operation display submodule includes an authentication display unit and an operation display unit.

The authentication display unit is configured to display an authentication control based on the trigger operation for the room creation control.

The operation display unit is configured to set authentication information of the created information exchange virtual room when detecting that a setting operation for the authentication control is completed, and display the user operation page of the created information exchange virtual room.

In some embodiments of this disclosure, the authentication display unit is specifically configured to display a room member quantity control and the authentication control based on the trigger operation for the room creation control, the room member quantity control being configured to set a quantity threshold of room members in the information exchange virtual room.

In an embodiment, the authentication display unit is further configured to: display the room member quantity control based on the trigger operation for the room creation control; and set the quantity threshold of room members in the created information exchange virtual room when detecting that a setting operation for the room member quantity control is completed, and display the authentication control.

In some embodiments of this disclosure, the display module 401 includes a join display submodule and an operation display submodule.

The join display submodule is configured to display a room join page of a client, the room join page including a room join entry of the created information exchange virtual room.

The operation display submodule is configured to add a room member identifier of the client to the specified information exchange virtual room based on a trigger operation for the room join entry, and display a user operation page of the joined information exchange virtual room.

In an embodiment, the display module 401 further includes an input display submodule.

The input display submodule is configured to: display a room identifier input control when a trigger operation for the room join control is detected.

The operation display submodule is further configured to add, based on an input operation for the room identifier input control, the room member identifier of the client to an information exchange virtual room corresponding to an inputted room identifier, and display a user operation page of the joined information exchange virtual room.

In some embodiments of this disclosure, the operation display submodule is specifically configured to:
- display, based on the input operation for the room identifier input control, an authentication information input control of the information exchange virtual room corresponding to the inputted room identifier; and
- add, when authentication information inputted based on the authentication information input control passes verification, the room member identifier of the client to the information exchange virtual room corresponding to the room identifier, and display a user operation page of the information exchange virtual room.

In some embodiments of this disclosure, the user operation page further includes a preview image effect control, and the image capturing apparatus further includes an effect implementation module 404, configured to implement a corresponding image effect for the preview image based on an operation for the preview image effect control.

In this embodiment, the shooting module 402 is configured to perform, when the trigger operation for the shooting control is detected, image capturing on the preview image obtained after the image effect is implemented.

Figure 24:
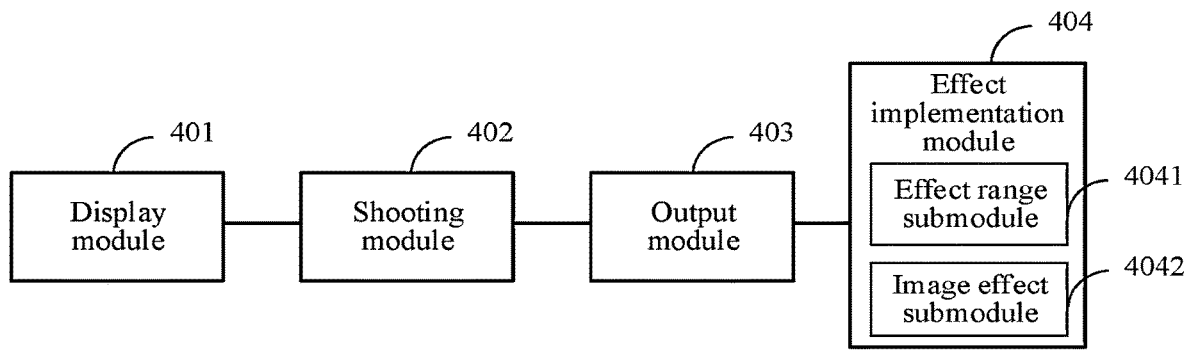
FIG. 24 is another exemplary block diagram of an image capturing apparatus according to an embodiment of this disclosure.

In some embodiments of this disclosure, the preview image effect control includes a member image effect control. As shown in FIG. 24, the effect implementation module 404 includes an effect range submodule 4041 and an image effect submodule 4042.

The effect range submodule 4041 is configured to: display, based on a setting operation for the member image effect control, an effect range control corresponding to an inputted target member effect.

The image effect submodule 4042 is configured to: implement, for a corresponding member image, an image effect corresponding to the target member effect when detecting that a setting operation for the effect range control is completed.

In some embodiments of this disclosure, the effect range control includes an all member control, the member image includes a local member image collected in real time by a local terminal, and the effect range submodule 4041 is specifically configured to implement the image effect corresponding to the target member effect for all member images of the image region when a selected operation for the all member control is detected.

In an embodiment, the effect range control includes a partial member control. The effect range submodule 4041 is further configured to implement the image effect corresponding to the target member effect for selected member images of the image region when a selected operation for the partial member control is detected.

In an embodiment, the effect range control includes a local member control. The effect range submodule 4041 is further configured to implement the image effect corresponding to the target member effect for the local member image of the image region when a selected operation for the local member control is detected.

In some embodiments of this disclosure, the image capturing apparatus further includes a preview image display module and an editing effect display module.

The preview image display module is configured to display an image preview page, the image preview page including the captured image and an image editing control.

The editing effect display module is configured to display, in real time on the image preview page, an editing effect of the captured image based on an editing operation for the image editing control.

In some embodiments of this disclosure, the image capturing apparatus further includes an acquiring module, an extraction module, a transmitting module, and a receiving module.

The acquiring module is configured to acquire an image collected in real time by a local terminal.

The extraction module is configured to extract a local member image in the real-time collected image and location information of the local member image in the real-time collected image.

The transmitting module is configured to transmit the local member image and the location information of the local member image to a server.

The receiving module is configured to receive a preview image returned by the server based on the local member image and the location information of the local member image, the preview image including member images of at least two room members.

In some embodiments of this disclosure, the image region includes at least two image sub-regions, and the display module includes an acquiring submodule and a display submodule.

The acquiring submodule is configured to acquire a mapping relationship between an image sub-region and a room member.

The display submodule is configured to display the user operation page of the information exchange virtual room of the client based on the mapping relationship, the user operation page including an image region, the image region including at least two image sub-regions, and a preview image in the image sub-region including a member image of a room member that has a mapping relationship with the image sub-region.

In this embodiment of this disclosure, the display module 401 first displays a user operation page of an information exchange virtual room of a client, where the user operation page includes a shooting control and an image region, the image region includes a preview image, and the preview image includes member images of at least two room members. When a trigger operation for the shooting control is detected, the shooting module 402 performs image capturing on the preview image, and finally the output module 403 outputs a captured image. In the solution of this disclosure, an information exchange virtual room may be used as a medium, so that at least two room members can perform image capturing in a preview image.

For exemplary functions of the image capturing apparatus, refer to the features of the image capturing method described above. Details are not described herein again. The modules in the foregoing image capturing apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

Figure 25:
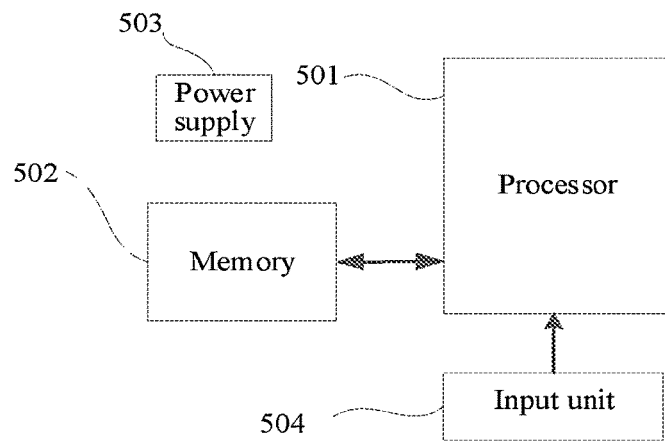
FIG. 25 is a block diagram of a computer device according to an embodiment of this disclosure.

In addition, an embodiment of this disclosure further provides a computer device. The computer device may be a terminal or a server. FIG. 25 is a block diagram of a computer device related to an embodiment of this disclosure.

The computer device may include components such as processing circuitry (e.g., one or more processors 501 including one or more processing cores), a memory 502 including one or more computer-readable storage media, a power supply 503, and an input unit 504. The structure of the computer device shown in FIG. 25 does not constitute a limitation to the computer device. The computer device may include components that are more or fewer than those shown in the figure, or some components may be combined, or a different component deployment may be used.

The one or more processors 501 are a control center of the computer device, and is connected to various parts of the entire computer device by using various interfaces and lines. By running or executing software programs and/or modules stored in the memory 502, and invoking data stored in the memory 502, the processor performs various functions and data processing of the computer device, thereby performing overall monitoring on the computer device. The one or more processors 501 may include one or more processing cores. The one or more processors 501 may integrate one or more application processors and one or more communication processors. The application processor mainly processes an operating system, a user interface, an application program, and the like, and the one or more communication processors mainly process wireless communication. It to be understood that alternatively, the one or more communication processors may not be integrated into the one or more processors 501.

The memory 502 may be configured to store the software programs and modules. The one or more processors 501 run the software programs and modules stored in the memory 502, to perform various function application and data processing. The memory 502 may mainly include a program storage area and a data storage area. The program storage area may store an operating system, an application program required by at least one function (e.g., a sound playback function and an image display function), and the like. The data storage area may store data created according to use of the computer device, and the like. In addition, the memory 502 may include a high-speed random access memory, and may further include a non-volatile memory, such as at least one magnetic disk storage device, a flash memory, or another volatile solid-state storage device. The memory 502 may further include a memory controller, so that the one or more processors 501 can access the memory 502.

The computer device further includes the power supply 503 for supplying power to the components. The power supply 503 may be logically connected to the one or more processors 501 by using a power management system, thereby implementing functions such as charging, discharging, and power consumption management by using the power management system. The power supply 503 may further include one or more of a direct current or alternating current power supply, a re-charging system, a power failure detection circuit, a power supply converter or inverter, a power supply state indicator, and any other component.

The computer device may further include the input unit 504. The input unit 504 may be configured to receive input digit or character information and generate keyboard, mouse, joystick, optical, or trackball signal input related to user settings and function control.

Although not shown in the figure, the computer device may further include a display unit, and the like. Details are not described herein again. Specifically, in this embodiment, the one or more processors 501 in the computer device may load executable files corresponding to processes of one or more application programs to the memory 502 according to the following instructions, and the one or more processors 501 run the application programs stored in the memory 502, to implement various functions.

Exemplary functions include displaying a user operation page of an information exchange virtual room of a client, the user operation page including a shooting control and an image region, the image region including a preview image, and the preview image including member images of at least two room members; performing image capturing on the preview image when a trigger operation for the shooting control is detected; and outputting a captured image.

For exemplary implementations of the above operations, refer to the foregoing embodiments. Details are not described herein again.

All or some steps of various embodiments in the embodiments may be implemented through computer-readable instructions, or implemented through the computer-readable instructions controlling relevant hardware, and the instructions may be stored in a computer-readable storage medium and loaded and executed by one or more processors.

Therefore, an embodiment of this disclosure further provides one or more computer-readable storage media (e.g., one or more non-transitory computer-readable storage mediums), storing computer-readable instructions. The computer-readable instructions can be loaded by one or more processors, so as to perform steps in any image capturing method provided in the embodiments of this disclosure.

For example, the computer-readable instructions may perform displaying a user operation page of an information exchange virtual room of a client, the user operation page including a shooting control and an image region, the image region including a preview image, and the preview image including member images of at least two room members; performing image capturing on the preview image when a trigger operation for the shooting control is detected; and outputting a captured image.

For exemplary implementations of the above operations, refer to the foregoing embodiments. Details are not described herein again.

The storage medium may include: a read-only memory (ROM), a random access memory (RAM), a magnetic disk, an optical disc, or the like.

Because the computer-readable instructions stored in the storage medium may execute steps in any image capturing method provided in the embodiments of this disclosure, beneficial effects that can be implemented in any image capturing method provided in the embodiments of this disclosure can be implemented. For details, refer to the foregoing embodiments, and details are not described herein again.

The image capturing method, the apparatus, the computer device, and the storage medium provided in the embodiments of the present disclosure are described above in detail. Although the principles and implementations of the present disclosure are described by using specific examples in this specification, the descriptions of the foregoing embodiments are merely intended to help understand the method of the present disclosure. The content of this specification should not be construed as a limitation to the present disclosure.

What is claimed is:

1. A method of capturing a virtual group image, comprising:

sending a plurality of first user images of a first user to a server;

receiving a plurality of preview images, each of the plurality of preview images being generated based on a respective first user image of the plurality of first user images of the first user and a respective second user image of a plurality of second user images of a second user in which the respective first user image and the respective second user image are combined into the respective preview image with a common background;

displaying the plurality of preview images sequentially in a user interface that includes a shooting control element and an image effect control interface that includes a user image effect control element;

displaying, based on a selection of the user image effect control element, an effect range control interface corresponding to an inputted target user effect;

applying an image effect corresponding to the target user effect when a setting operation via the effect range control interface is completed; and obtaining, by processing circuitry, the virtual group image that corresponds to one of the plurality of preview images based on a user selection of the shooting control element in the user interface while the one of the plurality of preview images is displayed in the user interface, wherein the virtual group image corresponds to the preview image to which the image effect is applied.

2. The method according to claim 1, wherein each of the plurality of preview images includes a first extracted region of the respective first user image and a second extracted region of the respective second user image.

3. The method according to claim 2, wherein the sending includes sending the plurality of first user images of the first user and respective location information for each of the plurality of the first user images to the server, and a location of the first extracted region in each of the plurality of preview images is based on the respective location information of the respective first user image.

4. The method according to claim 1, further comprising: capturing the plurality of first user images of the first user in real-time.

5. The method according to claim 1, further comprising: displaying the virtual group image and an image editing control interface; and displaying an editing effect on the virtual group image based on an editing operation performed via the image editing control interface.

6. A terminal device, comprising:

processing circuitry configured to:

send a plurality of first user images of a first user to a server;

receive a plurality of preview images, each of the plurality of preview images being generated based on a respective first user image of the plurality of first user images of the first user and a respective second user image of a plurality of second user images of a second user in which the respective first user image and the respective second user image are combined into the respective preview image with a common background;

display the plurality of preview images sequentially in a user interface that includes a shooting control element and an image effect control interface that includes a user image effect control element;

display, based on a selection of the user image effect control element, an effect range control interface corresponding to an inputted target user effect;

apply an image effect corresponding to the target user effect when a setting operation via the effect range control interface is completed; and obtain a virtual group image that corresponds to one of the plurality of preview images based on a user selection of the shooting control element in the user interface while the one of the plurality of preview images is displayed in the user interface, wherein the virtual group image corresponds to the preview image to which the image effect is applied.

7. The terminal device according to claim 6, wherein each of the plurality of preview images includes a first extracted region of the respective first user image and a second extracted region of the respective second user image.

8. The terminal device according to claim 7, wherein the processing circuitry is configured to send the plurality of first user images of the first user and respective location information for each of the plurality of the first user images to the server, and a location of the first extracted region in each of the plurality of preview images is based on the respective location information of the respective first user image.

9. The terminal device according to claim 6, wherein the processing circuitry is configured to:

capture the plurality of first user images of the first user in real-time.

10. The terminal device according to claim 6, wherein the processing circuitry is configured to:

display the virtual group image and an image editing control interface; and display an editing effect on the virtual group image based on an editing operation performed via the image editing control interface.

11. A non-transitory computer-readable storage medium storing instructions which when executed by one or more processors cause the one or more processors to perform:

sending a plurality of first user images of a first user to a server;

receiving a plurality of preview images, each of the plurality of preview images being generated based on a respective first user image of the plurality of first user images of the first user and a respective second user image of a plurality of second user images of a second user in which the respective first user image and the respective second user image are combined into the respective preview image with a common background;

displaying the plurality of preview images sequentially in a user interface that includes a shooting control element and an image effect control interface that includes a user image effect control element;

displaying, based on a selection of the user image effect control element, an effect range control interface corresponding to an inputted target user effect;

applying an image effect corresponding to the target user effect when a setting operation via the effect range control interface is completed; and obtaining, by processing circuitry, a virtual group image that corresponds to one of the plurality of preview images based on a user selection of the shooting control element in the user interface while the one of the plurality of preview images is displayed in the user interface, wherein the virtual group image corresponds to the preview image to which the image effect is applied.

12. The non-transitory computer-readable storage medium according to claim 11, wherein each of the plurality of preview images includes a first extracted region of the respective first user image and a second extracted region of the respective second user image.

13. The non-transitory computer-readable storage medium according to claim 12, wherein
the sending includes sending the plurality of first user images of the first user and respective location information for each of the plurality of the first user images, and
a location of the first extracted region in each of the plurality of preview images is based on the respective location information of the respective first user image.

14. The non-transitory computer-readable storage medium according to claim 11, further comprising:
capturing the plurality of first user images of the first user in real-time.

* * * * *